United States Patent
Takihara et al.

(10) Patent No.: US 9,234,065 B2
(45) Date of Patent: Jan. 12, 2016

(54) ACTIVE ENERGY RAY-CURABLE RESIN COMPOSITION, PRODUCT HAVING THE UNEVEN MICROSTRUCTURE, AND METHOD FOR PRODUCING PRODUCT HAVING THE UNEVEN MICROSTRUCTURE

(71) Applicant: Mitsubishi Rayon Co., Ltd., Tokyo (JP)

(72) Inventors: Tsuyoshi Takihara, Otake (JP); Eiko Okamoto, Otake (JP); Go Otani, Otake (JP); Yusuke Nakai, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 14/317,197

(22) Filed: Jun. 27, 2014

(65) Prior Publication Data

US 2014/0314993 A1 Oct. 23, 2014

Related U.S. Application Data

(62) Division of application No. 13/976,263, filed as application No. PCT/JP2012/050415 on Jan. 12, 2012.

(30) Foreign Application Priority Data

Jan. 12, 2011 (JP) ................................ 2011-004085
Jan. 12, 2011 (JP) ................................ 2011-004091

(51) Int. Cl.
| | | |
|---|---|---|
| C08F 2/46 | (2006.01) |
| C08G 61/04 | (2006.01) |
| C08F 220/36 | (2006.01) |
| C08F 290/04 | (2006.01) |
| B32B 3/10 | (2006.01) |
| B08B 17/06 | (2006.01) |
| B29C 59/16 | (2006.01) |
| C08F 290/06 | (2006.01) |

(52) U.S. Cl.
CPC ............. C08F 220/36 (2013.01); B08B 17/065 (2013.01); B29C 59/16 (2013.01); B32B 3/10 (2013.01); C08F 290/046 (2013.01); C08F 290/062 (2013.01); Y10T 428/24355 (2015.01)

(58) Field of Classification Search
CPC .. C08F 220/36; C08F 290/06; C08F 290/046; C08F 222/1006; C08F 299/00; B32B 3/10; B29C 59/16; B08B 17/065

USPC ................................. 522/179, 178, 1; 520/1
See application file for complete search history.

(56) References Cited

U.S. PATENT DOCUMENTS

| | | | |
|---|---|---|---|
| 2003/0044688 A1 | 3/2003 | Kang et al. |
| 2010/0323165 A1* | 12/2010 | Sakuma et al. ............... 428/167 |
| 2013/0129977 A1 | 5/2013 | Takihara et al. |

FOREIGN PATENT DOCUMENTS

| | | |
|---|---|---|
| CN | 101663600 A | 3/2010 |
| JP | 02-274713 A | 11/1990 |
| JP | 04-247336 A | 9/1992 |
| JP | 10-166734 A | 6/1998 |
| JP | 2000-071290 A | 3/2000 |
| JP | 2002-107501 A | 4/2002 |
| JP | 2002-216845 A | 8/2002 |
| JP | 2007-084625 A | 4/2007 |
| JP | 4156415 B2 | 7/2008 |
| JP | 2010-000719 A | 1/2010 |

OTHER PUBLICATIONS

Extended European Search Report issued in counterpart European Patent Application No. 12734505.6 dated Sep. 10, 2014.
Office Action issued in counterpart Chinese Patent Application No. 201280004456.4 dated Apr. 17, 2014.
International Search Report issued in related International Patent Application No. PCT/JP2012/050415 dated Apr. 3, 2012.
International Preliminary Report on Patentability issued in related International Patent Application No. PCT/JP2012/050415 dated Jul. 25, 2013.
Written Opinion issued in related International Patent Application No. PCT/JP2012/050415 dated Apr. 3, 2012.

* cited by examiner

*Primary Examiner* — Ling Choi
*Assistant Examiner* — Jessica E Whiteley
(74) *Attorney, Agent, or Firm* — Morgan, Lewis & Bockius LLP

(57) ABSTRACT

The present invention provides an active energy ray-curable resin composition comprising at least a multifunctional monomer having three or more radical polymerizable functional groups in the molecule in which the cured product of the composition exhibits anti-reflective function because of an uneven microstructure formed on the surface of the cured product, and provides a product having the uneven microstructure having high decontaminating properties such as fingerprint removal properties and high scratch resistance.

10 Claims, 3 Drawing Sheets

ACTIVE ENERGY RAY-CURABLE RESIN COMPOSITION, PRODUCT HAVING THE UNEVEN MICROSTRUCTURE, AND METHOD FOR PRODUCING PRODUCT HAVING THE UNEVEN MICROSTRUCTURE

TECHNICAL FIELD

The present invention relates to an active energy ray-curable resin composition which is usable for forming members, particularly products having the uneven microstructure (nano-order unevenness) having an excellent decontaminating effect such as removing fingerprint and having high scratch resistance. Further, the present invention relates to a material for imprint comprising the resin composition, a product having the uneven microstructure formed by using the resin composition, particularly display members. The present invention also relates to a method for production of a product having the uneven microstructure using the resin composition.

BACKGROUND ART

It is known that a product having the uneven microstructure regularly disposed nano-sized fine roughness on the surface is continuously shifting the refractive index and then exhibits anti-reflect performance. It is also known that the product having the uneven microstructure exhibits the same effect as super hydrophobicity (lotus effect) which lotus leaves having fine downy hairs are showing.

As a method for producing articles having uneven microstructure on the surface, the following methods have been proposed:
(i) a method of using a stamper having the inverse structure of a uneven microstructure on the surface and transferring the uneven microstructure onto the surface of thermoplastic resin moldings by injecting or pressing a thermoplastic resin;
(ii) a method of transferring the uneven microstructure onto the cured product which comprises filling an active energy ray-curable resin composition between a stamper having the inverse structure of uneven microstructure on the surface and a transparent base material, curing it by irradiation with an active energy ray, and then removing the stamper; and
(iii) a method of filling an active energy ray-curable resin composition between the above stamper and a transparent base material, then removing the stamper to transfer the uneven microstructure onto the active energy ray-curable resin composition, and subsequently, curing the active energy ray-curable resin composition by irradiation with an active energy ray.

Among them, the method (ii) curing the resin composition by irradiation with the active energy ray to transfer the uneven microstructure is suitable, in consideration of transferability of the uneven microstructure and optionality of the surface composition. This method is particularly suitable for use of a belt- or roll-type stamper enabling continuous production, and is also a highly productive method.

The uneven microstructure exhibits high anti-reflective performance, when the interval between adjacent convex or concave portions of the micro-relief is equal to or less than wavelength of visible light. However, the product having the uneven microstructure having such a structure is in scratch resistance inferior to the articles which have smooth surface and are treated for abrasion resistance with a hard coat or the like, and has problems with durability in use. Moreover, if the resin composition used for production of the product having the uneven microstructure has not well solid, a phenomenon of projections gathering together occurs in removing from the mold or by heating.

Then, to maintain the uneven microstructure, a product having the uneven microstructure formed by curing a resin composition by irradiation with an active energy ray and transferring the inverse uneven microstructure of a stamper, and resin compositions for forming such an uneven microstructure were proposed.

For example, it is known to produce a product having the uneven microstructure having an interval between convex portions (concave portions) of not more than the wavelength of visible light using close-packed silica sol as a mold, and to use a multifunctional monomer inclosing extremely large number of double bonds per molecular weight such as trimethylolpropane triacrylate in the resin composition which is used for forming the uneven microstructure (Patent Literature 1).

Further, a film having a hard coat layer having an uneven microstructure is disclosed. The hard coat layer is formed of a resin exhibiting a hardness of "H" or more in a pencil hardness test according to JIS K5600-5-4. And the resin is produced using a multifunctional monomer having an extremely large number of double bonds per molecular weight such as dipentaerythritol hexaacrylate, dipentaerythritol pentaacrylate and pentaerythritol tetraacrylate (Patent Literature 2).

Meanwhile, as preferable resin compositions for forming the uneven microstructure followings are known:
(1) a photo-curable resin composition containing an acrylate oligomer such as urethane acrylate and a release agent as essential components (Patent Literature 3);
(2) a photo-curable resin composition composed of a (meth)acrylate such as ethoxylated bisphenol-A di(meth)acrylate, a reactive diluent such as N-vinylpyrrolidone, a photoinitiator, and a fluorosurfactant (Patent Literature 4); and
(3) an ultraviolet light curable resin composition comprising a multifunctional (meth)acrylate such as trimethylolpropane tri(meth)acrylate, a photoinitiator, and a leveling agent such as polyether-modified silicone oil (Patent Literature 1).

However, the products having the uneven microstructure described in Patent Literatures 1 and 2 each are a cured product having a high crosslinking density and a high elastic modulus, but do not always satisfy scratch resistance. Even if a cured resin is a hardness of "H" or more in the pencil hardness test, the product having the uneven microstructure particularly is impaired the anti-reflective performance by breakage or bending of fine projections of the product having the uneven microstructure, and therefore, its uses are limited. It is also difficult to wipe off dirt adhered on the uneven microstructure such as fingerprints.

On the other hand, for antifouling property of resin molded articles, a method for suppressing adhesion of dirt by providing hydrophobicity thereon using a silicone- or fluoro-compound. On the contrary, a method for making the surface of the resin molding hydrophilic to promote soaking water between the adhered dirt such as fingerprints and the surface of the resin, and floating the dirt with water by water wiping also presents. However, making the surface of a resin molded article hydrophilic naturally results in enhancement of moisture absorbing properties of the resin molded article and softening of the molded article, and the uneven microstructure formed on the surface of the molding trends to be impossible to be maintained.

Since the cured products described in above Patent Literatures 1, 3 and 4 are insufficient hydrophobic, even if trying to remove the dirt adhered on the surface of the uneven microstructure such as fingerprints by water wiping the dirt, the dirt does not float up with water and fingerprints and the like are difficult to be wiped off. On the other hand, the simply increased hydrophobicity of the resin only increases absorption of water by the resin, and a softened molded article will be obtained. If a molded article having a nano-order uneven microstructure on the surface is formed using such a resin, the nano-order projections gather together caused by surface tension and scatter light to reduce the reflection suppressing effect and have problem with falling white and hazy after water-wiping.

CITATION LIST

Patent Literature

Patent Literature 1: JP2000-71290A
Patent Literature 2: JP2002-107501A
Patent Literature 3: JP4156415B
Patent Literature 4: JP2007-84625A

SUMMARY OF INVENTION

Technical Problem

An object of the present invention is to provide an active energy ray-curable resin composition which can provide a cured product exhibiting anti-reflective function because of an uneven microstructure formed on the surface thereof and having high decontaminating property such as fingerprint removal property as well as having high scratch resistance, and to provide a material for imprint comprising the active energy ray-curable resin composition, as well as to provide a product having the uneven microstructure formed using them, particularly display members and a method for producing a product having the uneven microstructure.

Solution to Problem

The inventors found out that the problems can be solved by holding an active energy ray-curable resin composition comprising at least a monomer (oligomer) having three or more radical polymerizable functional groups in the molecule between a base material and a stamper having the inverse structure of an uneven microstructure, and irradiating with an active energy ray to cure the resin composition, and further studied and completed the present invention.

Namely, the present invention is an active energy ray-curable resin composition comprising a multifunctional monomer having at least three radical polymerizable functional groups in the molecule,
wherein the composition of the resin composition comprising:
(1) a multifunctional monomer (A) and a mono(meth)acrylate (B) having a polyethylene glycol structure having a number of repeating ethylene glycol units of 9 or more, wherein the content of multifunctional monomer (A) is 70 to 95 parts by mass, and the content of mono(meth)acrylate (B) is 5 to 30 parts by mass (wherein the total of contents of all the monomers contained in the resin composition is 100 parts by mass), wherein the multifunctional monomer (A) has three or more radical polymerizable functional groups in the molecule, and a value obtained by dividing molecular weight of the multifunctional monomer (A) by the number of radical polymerizable functional groups (molecular weight per functional group) is 110 to 200; or (2) a polymerizable component (X), wherein the polymerizable component (X) comprises 15 to 70% by mass of a multifunctional monomer (XA) which has three or more radical polymerizable functional groups in the molecule, molecular weight per functional group of less than 110, and no ethyl group in the terminal; 15 to 50% by mass of a multifunctional monomer (XB) which has three or more radical polymerizable functional groups in the molecule, molecular weight per functional group of 110 or more, and no ethyl group in the terminal; and 15 to 40% by mass of a bifunctional monomer (XC) which has two radical polymerizable functional groups and four or more oxyethylene groups in the molecule, and no methyl group in the terminal, and further containing a photoinitiator (XE).

That is, the first invention of the present application is an active energy ray-curable resin composition comprising the multifunctional monomer (A) and the mono(meth)acrylate (B) having a polyethylene glycol structure having a number of repeated ethylene glycol units of 9 or more, wherein the content of multifunctional monomer (A) is 70 to 95 parts by mass, and the content of mono(meth)acrylate (B) is 5 to 30 parts by mass (wherein the total of contents of all the monomers contained in the resin composition is 100 parts by mass), wherein the multifunctional monomer (A) has three or more radical polymerizable functional groups in the molecule, and the value obtained by dividing the molecular weight of the multifunctional monomer (A) by the number of radical polymerizable functional groups (molecular weight per functional group) is 110 to 200.

Moreover, the second invention of the present application is an active energy ray-curable resin composition comprising a polymerizable component (X) and a photoinitiator (XE), wherein the polymerizable component (X) comprises 15 to 70% by mass of a multifunctional monomer (XA) which has three or more radical polymerizable functional groups in the molecule, molecular weight per functional group of less than 110, and no ethyl group in the terminal; 15 to 50% by mass of a multifunctional monomer (XB) which has three or more radical polymerizable functional groups in the molecule, molecular weight per functional group of 110 or more, and no ethyl group in the terminal; and 15 to 40% by mass of a bifunctional monomer (XC) which has two radical polymerizable functional groups and four or more oxyethylene groups in the molecule, and no methyl group in the terminal.

The present inventions also relate to a material for imprint comprising the active energy ray-curable resin composition, a product having the uneven microstructure that is a cured product of the active energy ray-curable resin composition and has an uneven microstructure formed on the surface of the cured product, and a display member equipping with the product having the uneven microstructure.

The present invention is a method for producing a product having the uneven microstructure having an uneven microstructure on the surface thereof,
wherein the method comprises, disposing the active energy ray-curable resin composition between a stamper having the inverse structure of the uneven microstructure formed and a base material, irradiating with an active energy ray to cure the active energy ray-curable resin composition, and then removing the stamper.

Advantageous Effects of Invention

The active energy ray-curable resin composition of the invention of the present application can form a product having the uneven microstructure and the like having excellent scratch resistance and high decontaminating effect such as fingerprint removal property. Moreover, since the product having the uneven microstructure of the invention of the present application has an extremely high anti-reflective effect, it is extremely useful as display members.

DESCRIPTION OF EMBODIMENTS

Figure 1:
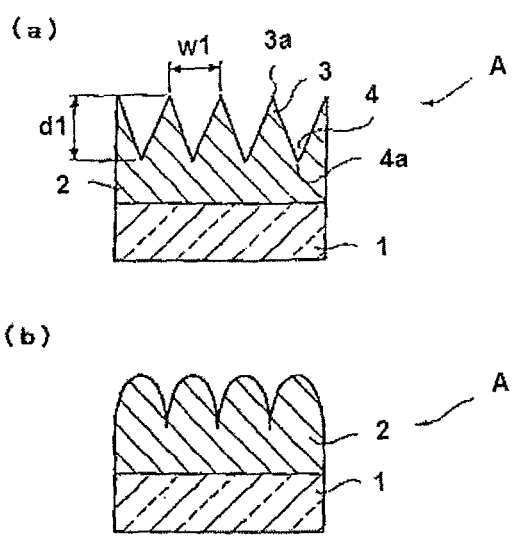
FIG. 1 is a schematic sectional view showing a product having the uneven microstructure according to the invention of the present application.

The active energy ray-curable resin composition of the first invention of the present application comprises a multifunctional monomer (A) and a mono(meth)acrylate (B) having a polyethylene glycol structure having a number of repeating ethylene glycol units of 9 or more, wherein the content of multifunctional monomer (A) is 70 to 95 parts by mass, the content of mono(meth)acrylate (B) is 5 to 30 parts by mass (wherein the total of contents of all the monomers contained in the resin composition is 100 parts by mass), and the multifunctional monomer (A) has three or more radical polymerizable functional groups in the molecule, and the value obtained by dividing molecular weight of the multifunctional monomer (A) by the number of radical polymerizable functional groups, that is, the molecular weight/the number of radical polymerizable functional groups is 110 to 200.

[Multifunctional Monomer (A)]

The multifunctional monomer (A) is a main component of the active energy ray-curable resin composition (hereinafter, referred to as a "resin composition," unless otherwise specified), and plays a role in maintaining the mechanical properties, particularly scratch resistance of the cured product. The multifunctional monomer (A) has three or more radical polymerizable functional groups in the molecule. Thereby, the cured product obtained of the resin composition has a shorter distance between crosslinking points, crosslinking density thereof is heightened, and elastic modulus and hardness thereof are improved and makes scratch resistance excellent. As the radical polymerizable functional groups, a methacryloyl group and an acryloyl group typically may be mentioned.

The multifunctional monomer (A) has the value obtained by dividing molecular weight of the multifunctional monomer (A) by the number of radical polymerizable functional groups, that is, the molecular weight/the number of radical polymerizable functional groups (molecular weight per functional group) of 110 to 200, preferably 120 to 180, and more preferably 130 to 155. When the molecular weight per functional group is 110 or more, the fragility of the cured product caused by increasing in the hardness by excessive crosslinking can be suppressed. When the molecular weight per functional group is 200 or less, the reduction of the elastic modulus and hardness of the cured product and the resulted reduction of scratch resistance of the cured product which are caused by insufficient crosslinking can be suppressed.

For example, when the multifunctional monomer (A) is trimethylolpropane triacrylate, the molecular weight is 296, and the number of radical polymerizable functional groups is 3. Then, the molecular weight/the number of radical polymerizable functional groups=98.7. Tetrafunctional monomers having molecular weight more than 800 and hexafunctional monomers having molecular weight more than 1200 are not included as the multifunctional monomer (A) of the first invention of the present application, even though they are multifunctional monomers, because they are the molecular weight per functional group of more than 200.

As the multifunctional monomer (A), for example, urethane (meth)acrylate, epoxy (meth)acrylate, polyester (meth)acrylate and polyether (meth)acrylate may be mentioned. Specifically, the followings may be mentioned.

As a trifunctional monomer, for example, tri(meth)acrylates of non-, ethoxy-, propoxy-, ethoxy/propoxy-, or butoxy-modified trimethylolpropane; tri(meth)acrylates of non-, ethoxy-, propoxy-, ethoxy/propoxy-, or butoxy-modified pentaerythritol; tri(meth)acrylates of non-, ethoxy-, propoxy-, ethoxy/propoxy-, or butoxy-modified isocyanuric acid; and triacrylates of non-, ethoxy-, propoxy-, ethoxy/propoxy-, or butoxy-modified glycerol may be mentioned.

As a tetrafunctional monomer, for example, tetra(meth)acrylates of non-, ethoxy-, propoxy-, ethoxy/propoxy-, or butoxy-modified pentaerythritol; and tetra(meth)acrylates of non-, ethoxy-, propoxy-, ethoxy/propoxy-, or butoxy-modified ditrimethylolpropane may be mentioned.

As a multifunctional monomer having 5 or more functionalities, for example, hexa(meth)acrylates of non-, ethoxy-, propoxy-, ethoxy/propoxy-, or butoxy-modified dipentaerythritol may be mentioned.

In this application, (meth)acrylate refers to either methacrylate or acrylate.

As the multifunctional monomer (A), urethane (meth)acrylate obtained by reacting a polyol and/or an isocyanate compound with a (meth)acrylate having a hydroxyl group may be used. The commercially available products of such an urethane (meth)acrylate, are, for example, "NK Oligo™ U-6HA" made by Shin Nakamura Chemical Co., Ltd., "EBECRYL®" series 220, 1290, 5129 and 8210 and "KRM®" series 8200 made by DAICEL-CYTEC Company LTD., and "UA-306H" made by Kyoeisha Chemical Co., Ltd. (all are trade names).

These may be used singly or in combination of two or more. Among them, particularly from the viewpoint of polymerization reactivity, tri(meth)acrylates of ethoxy-modified trimethylolpropane, tri(meth)acrylates of ethoxy-modified pentaerythritol, tetra(meth)acrylates of ethoxy-modified pentaerythritol, tetra(meth)acrylates of ethoxy-modified ditrimethylolpropane, and hexa(meth)acrylates of ethoxy-modified dipentaerythritol are preferable. Use of "NK Ester™" series ATM-4E and A-TMPT-3EO made by Shin Nakamura Chemical Co., Ltd., "EBECRYL® 40" made by DAICEL-CYTEC Company LTD., "NEW FRONTIER® TMP-2" made by Daiichi Kogyo Seiyaku Co., Ltd., and "LIGHT ACRYLATE™ TMP-6EO-A" made by Kyoeisha Chemical Co., Ltd. (all are trade names) is also preferable.

When a urethane monomer or the like is synthesized using a plurality of raw materials, a mixture of different compounds having the different numbers of functional groups may be obtained. In this case, the molecular weight per functional group to be used can be an average value obtained by dividing the total mass of the charged raw materials by the number of moles of the charged radical polymerizable functional groups.

The content of the multifunctional monomer (A) is 70 to 95 parts by mass, preferably 75 to 95 parts by mass, more preferably 80 to 90 parts by mass, and particularly preferably 85 to 90 parts by mass wherein the total of contents of all the monomers contained in the resin composition is 100 parts by mass. The proportion of the multifunctional monomer (A) contained can be controlled within the above range such that the total of contents of all the monomers, specifically, the multifunctional monomer (A), the mono(meth)acrylate (B) and the monomer (C) contained in the resin composition is 100 parts by mass. When the content of the multifunctional monomer (A) is 70 parts by mass or more, the cured product to be obtained has proper elastic modulus, hardness and scratch resistance. When the content of the multifunctional monomer (A) is 95 parts by mass or less, the cured product to be obtained can has high scratch resistance, suppressing fragility of the cured product, and in forming the uneven microstructure with a stamper, occurrence of cracking can be suppressed at removing the stamper.

In forming the uneven microstructure, as the shape of projections formed on the surface of the uneven microstructure is more elongated and higher, the shape is more difficult to be maintained, so a high hard resin is required. For example, in case of the projection height of over 180 nm, even the content of the multifunctional monomer (A) is within the above range based on 100 parts by mass of the total of the contents of the multifunctional monomer (A) and the mono(meth)acrylate (B), the uneven microstructure may be maintained.

[Mono(meth)acrylate (B)]

The mono(meth)acrylate (B) having a polyethylene glycol structure having a number of repeating ethylene glycol units of 9 or more is a compound which has in the molecule one radical polymerizable functional group and a polyethylene glycol structure in which the number of repeating ethylene glycol units is 9 or more. The mono(meth)acrylate (B) can give proper hydrophilicity to the cured product to be obtained, by having such a polyethylene glycol structure, and facilitates decontamination, particularly removal of fingerprints, adhering to the surface which has the uneven microstructure. Moreover, water absorption of the cured product can be suppressed and the uneven microstructure formed on the surface of the cured product can be maintained. The number of repeating ethylene glycol units in the polyethylene glycol structure is preferably 12 or more, and the number of repeating ethylene glycol units is preferably 20 or less, because it can be suppressed reduction of the crosslinking density and the hardness of the cured product and thereby the uneven microstructure can be maintained.

The mono(meth)acrylate (B) preferably has one (meth) acrylate group, which is a radical polymerizable functional group, in the molecule, because the mono(meth)acrylate (B) forms a polymer with the multifunctional monomer (A) and bleeding out from the cured product to be obtained is suppressed. By the number of the radical polymerizable functional group being one, water absorption resistance can be given to the cured product and moisture absorbing properties is suppressed unless increasing over necessity.

The mono(meth)acrylate (B) is preferably a compound which is compatible with the multifunctional monomer (A), because it is able to suppress that the resin composition falls cloudy and that the cured product clouds and fogs, even if the resin composition is transparent.

As the mono(meth)acrylate (B), for example, "NK Ester AM-130G" made by Shin Nakamura Chemical Co., Ltd., "Blemmer AME-400" and "Blemmer PME-550" made by NOF CORPORATION, and "FANCRYL FA-400M" made by Hitachi Chemical Company, Ltd. (all are trade names) may be used. These may be used singly or in combination of two or more.

The mono(meth)acrylate (B) may contain a polyoxyalkylene structure other than the polyethylene glycol structure, such as a polypropylene glycol structure, a polytetramethylene glycol structure, a bisphenol A skeleton, an alkyl chain and an urethane bond, between the polyethylene glycol structure and the radical polymerizable functional group. However, these groups other than the polyethylene glycol structure are preferably included in the range that the crosslinking density and hardness are not reduced. The proportion by mass of these groups in the molecule of the mono(meth)acrylate (B) is preferably 20% or less, and more preferably 10% or less. As the mono(meth)acrylate (B) having such a structure, for example, commercially available monomers such as "Blemmer 55PET-800" and "Blemmer AAE-300" made by NOF CORPORATION, "ARONIX M-114" made by TOAGOSEI CO., LTD., and "FANCRYL FA-318A" made by Hitachi Chemical Company, Ltd. (all are trade names), and acrylate monomers obtained by reacting terminal monomethoxylated polyethylene glycol with a compound having an isocyanate group such as "Karenz AOI" (trade name) made by Showa Denko K.K. can be used.

The content of the mono(meth)acrylate (B) is 5 to 30 parts by mass, preferably 5 to 25 parts by mass, more preferably 10 to 20 parts by mass, and particularly preferably 10 to 15 parts by mass, wherein the total of the contents of all the monomers contained in the resin composition is 100 parts by mass.

The proportion of the mono(meth)acrylate (B) can be controlled within the above range such that the total of contents of all the monomers, specifically, the multifunctional monomer (A), the mono(meth)acrylate (B) and the monomer (C) described later contained in the resin composition is 100 parts by mass. When the content of the mono(meth)acrylate (B) is 5 parts by mass or more, hydrophilicity allowing penetration of water between the dirt adhering on the surface of the cured product and the surface of the cured product can be given to the cured product, and the dirt can be easily removed. When the content of the mono(meth)acrylate (B) is 30 parts by mass or less, reduction in the crosslinking density can be suppressed, and softening of the cured product caused by absorption of water can be suppressed.

When forming the uneven microstructure, for example, the content of the mono(meth)acrylate (B) within the above range allows the uneven microstructure to be maintained even though the projections are higher than 180 nm.

[Monomer (C)]

The above resin composition may comprise a monomer (C) having one or more radical polymerizable functional groups in the molecule. The monomer (C) is preferably a monomer polymerizable with the multifunctional monomer (A) and the mono(meth)acrylate (B). The monomer (C) preferably maintains polymerization reactivity of the entire resin composition well and further improves handling properties and adhesion to a base material. The monomer (C) is preferably used in adjusting the content of the mono(meth)acrylate (B).

Preferably, the monomer (C) may excluded monomers increasing the hydrophilicity of the cured product over necessity such as polyethylene glycol di(meth)acrylate.

As the monomer (C), for example, alkyl (meth)acrylates such as methyl (meth)acrylate, ethyl (meth)acrylate, n-butyl (meth)acrylate, i-butyl (meth)acrylate, t-butyl (meth)acrylate, 2-ethylhexyl (meth)acrylate and lauryl (meth)acrylate; benzyl (meth)acrylate; (meth)acrylates having an alicyclic structure such as isobornyl (meth)acrylate, tetrahydrofurfuryl (meth)acrylate, adamantyl (meth)acrylate, dicyclopentanyl (meth)acrylate and dicyclopentenyl (meth)acrylate; (meth) acrylates having an amino group such as dimethylaminoethyl (meth)acrylate and dimethylaminopropyl (meth)acrylate; (meth)acrylate having a hydroxyl group such as 2-hydroxyethyl (meth)acrylate and hydroxypropyl (meth)acrylate; (meth)acrylamide derivatives such as (meth)acroylmorpholine and N,N-dimethyl (meth)acrylamide; 2-vinylpyridine; 4-vinylpyridine; N-vinylpyrrolidone; N-vinylformamide; and vinyl acetate may be mentioned.

These may be used singly or in combination of two or more. Among them, (meth)acroylmorpholine, 2-hydroxyethyl (meth)acrylate, N,N-dimethyl (meth)acrylamide, N-vinylpyrrolidone, N-vinylformamide, methyl (meth)acrylate, and ethyl (meth)acrylate are preferable, because these are not bulky and promote the polymerization reactivity of the resin composition. When an acrylic film is used as the base material described later, methyl (meth)acrylate and ethyl (meth)acrylate are particularly preferable.

The content of the monomer (C) is preferably 0 to 20 parts by mass, more preferably 0 to 10 parts by mass, still more preferably 1 to 10 parts by mass, and particularly preferably 3 to 10 parts by mass based on 100 parts by mass of the total of contents of the multifunctional monomer (A), the mono (meth)acrylate (B) and the monomer (C) in the resin composition. When the content of the monomer (C) is 10 parts by mass or less, the resin composition can be cured efficiently, and can suppress bad influences against the elastic modulus and scratch resistance of the cured product caused by acting of the remaining monomer as a plasticizer.

[Slip Agent (D)]

In the first invention of the present application, the resin composition preferably includes a slip agent (D). The slip agent (D) is a compound that exists in the surface of the resin cured product, and reduces friction on the surface to improve scratch resistance. The slip agent (D) is preferably compounds that make the surface of the cured product to be obtained hydrophilic because these compounds can promote penetration of water between the adhering dirt and the cured product, and give decontaminant performance. Such a slip agent is preferably polyether-modified silicone compounds, particularly silicone-based compounds having an HLB value of 10 or more, which is the inherent value of a surfactant. As such a slip agent (D) having an HLB value of 10 or more, for example, "SH3746 FLUID" and "FZ-77" made by Dow Corning Toray Co., Ltd., and "KF-355 A" and "KF-6011" made by Shin-Etsu Chemical Co., Ltd. (all are trade names) may be mentioned. These may be used singly or in combination of two or more.

The content of the slip agent (D) is preferably 0.01 to 10 parts by mass, and more preferably 0.1 to 5 parts by mass based on 100 parts by mass of the total of contents of the multifunctional monomer (A), the mono(meth)acrylate (B) and the monomer (C) in the resin composition. When the content of the slip agent (D) is 0.01 parts by mass or more, the curability of the resin composition and the mechanical properties, particularly scratch resistance of the cured product can be improved. When the content thereof is 10 parts by mass or less, reduction in the elastic modulus and scratch resistance of the cured product and coloring of the cured product caused by the slip agent remaining in the cured product can be suppressed.

[Other Components]

The above resin composition preferably includes an active energy ray polymerization initiator. The active energy ray polymerization initiator is a compound that cleaves by irradiation with an active energy ray to generate radicals that initiate a polymerization reaction. Here, the "active energy ray" means, for example, electron beam, ultraviolet light, visible light, plasma, thermal ray such as infrared radiation and the like. Particularly, from the viewpoint of cost of the apparatus and productivity, ultraviolet light is preferable used.

As the active energy ray polymerization initiator, specifically, benzophenone, 4,4-bis(diethylamino)benzophenone, 2,4,6-trimethylbenzophenone, methyl orthobenzoyl benzoate, 4-phenylbenzophenone, t-butyl anthraquinone and 2-ethyl anthraquinone; thioxanthones such as 2,4-diethylthioxanthone, isopropylthioxanthone and 2,4-dichlorothioxanthone; acetophenones such as diethoxyacetophenone, 2-hydroxy-2-methyl-1-phenylpropan-1-one, benzyl dimethyl ketal, 1-hydroxycyclohexyl-phenyl ketone, 2-methyl-2-morpholino(4-thiomethylphenyl)propan-1-one and 2-benzyl-2-dimethylamino-1-(4-morpholinophenyl)butan-1-one; benzoin ethers such as benzoin methyl ether, benzoin ethyl ether, benzoin isopropyl ether and benzoin isobutyl ether; acylphosphine oxides such as 2,4,6-trimethylbenzoyldiphenylphosphine oxide, bis(2,6-dimethoxybenzoyl)-2,4,4-trimethylpentylphosphine oxide and bis(2,4,6-trimethylbenzoyl)-phenylphosphine oxide; and methyl benzoyl formate, 1,7-bisacridinylheptane, and 9-phenylacridine may be mentioned. These may be used singly or in combination of two or more. Particularly, two or more of these having different absorption wavelengths are preferably used in combination.

If necessary, a thermal polymerization initiator such as a persulfuric acid salt such as potassium persulfate and ammonium persulfate, peroxide such as benzoyl peroxide, and azo-based initiators may be used in combination.

The content of the active energy ray polymerization initiator is preferably 0.01 to 10 parts by mass, more preferably 0.1 to 5 parts by mass, and particularly preferably 0.2 to 3 parts by mass based on the total of contents of the monomers in the resin composition of 100 parts by mass. When the content of the active energy ray polymerization initiator is 0.01 parts by mass or more, curability of the resin composition and the mechanical properties, particularly scratch resistance of the cured product can be improved. When the content of the active energy ray polymerization initiator is 10 parts by mass or less, reduction in the elastic modulus and scratch resistance of the cured product and coloring of the cured product caused by the polymerization initiator remaining in the cured product can be suppressed.

The resin composition may include an active energy ray absorber and/or an antioxidant. The active energy ray absorber preferably can absorb the active energy ray irradiated during curing the resin composition to suppress degradation of the resin. As the active energy ray absorber, for example, benzophenone-, benzotriazole- and benzoate-based absorbing agents may be mentioned. As their commercially available products, for example, "TINUVIN®" series 400 and 479 made by BASF SE, and "Viosorb®" series 110 made by KYODO CHEMICAL CO., LTD. (all are trade names) may be used. As the antioxidant, for example, phenol-based antioxidants, phosphorus-based antioxidants, sulfur-based antioxidants and hindered amine-based antioxidants may be mentioned. As their commercially available products, for example, "IRGANOX®" series made by BASF SE may be mentioned. These active energy ray absorbers and antioxidants may be used singly or in combination of two or more.

The content of the active energy ray absorber and/or antioxidant is preferably 0.01 to 5 parts by mass, more preferably 0.01 to 1 part by mass, and particularly preferably 0.01 to 0.5 parts by mass based on the total of contents of the monomers in the resin composition of 100 parts by mass. When the content of the active energy ray absorber and/or antioxidant is 0.01 parts by mass or more, yellowing the cured product to be obtained and increasing the haze can be suppressed, and weatherability can be improved. When the content is 0.5 parts by mass, reduction in the curability of the resin composition and the scratch resistance of the cured product to be obtained can be suppressed, and reduction in the adhesion of the cured product to the base material can be suppressed.

The resin composition may optionally contain additives such as a release agent, a lubricant, a plasticizer, an antistatic agent, a light stabilizer, a flame retardant, a flame retardant promoter, a polymerization inhibitor, a pigment, a silane coupling agent, a colorant, a strengthening agent, an inorganic filler, and an impact resistance modifier in the range of no inhibition of the functions of the multifunctional monomer (A) and the mono(meth)acrylate (B).

The resin composition preferably does not include any solvent, even though it may contain a solvent. In case of not comprising any solvent, a remaining solvent in the cured product of the resin composition can be eliminated, so environmental load can be reduced, and equipment for treating a solvent may be unnecessary, as well as the production process can be simplified.

[Physical Properties of Resin Composition]

The resin composition preferably has a viscosity of 10000 mPa·s or less measured at 25° C. with a rotary B type viscometer, when the uneven microstructure is formed with a stamper and cured. The viscosity is more preferably 5000 mPa·s or less, and still more preferably 2000 mPa·s or less. Even though the viscosity of the resin composition is 10000 mPa·s or more, in case of using the resin composition having the viscosity in the above range by warming, workability is not impaired, so the resin composition needs not a resin composition having the viscosity at 25° C. in the above range. The resin composition has a viscosity of preferably 5000 mPa·s or less, and more preferably 2000 mPa·s or less measured at 70° C. with a rotary B type viscometer.

Further, when the resin composition is sequentially cured using a belt- or roll-stamper having the uneven microstructure, the resin composition has a viscosity of preferably 100 mPa·s or more, more preferably 150 mPa·s or more, and particularly preferably 200 mPa·s or more measured at 25° C. with a rotary B type viscometer. When the viscosity of the resin composition is 100 mPa·s or more, leaking the resin composition from the stamper can be suppressed, and the thickness of the cured product can be easily controlled.

The viscosity of the resin composition can be controlled by adjusting the kind and content of the monomers. Specifically, the viscosity of the resin composition increases by using a large amount of a monomer having a functional group or chemical structure which has interactions between molecules such as hydrogen bond. The viscosity of the resin composition decreases by using a large amount of a low molecular weight monomer having no interaction between molecules.

The active energy ray-curable resin composition according to the second invention of the present application comprises a polymerizable component (X) and a photoinitiator (XE), and polymerizes and cures by irradiation with an active energy ray. The polymerizable component (X) comprises a multifunctional monomer (XA), a multifunctional monomer (XB), and a bifunctional monomer (XC).

[Polymerizable Component (X)]

[Multifunctional Monomer (XA)]

The multifunctional monomer (XA) comprises three or more radical polymerizable functional groups in the molecule, has molecular weight per functional group of less than 110, and has no terminal ethyl group in the molecule. The multifunctional monomer (XA) has three or more radical polymerizable functional groups in the molecule. This can provide a cured product having a high crosslinking density and a high elastic modulus and hardness, and plays a role in improving scratch resistance. The multifunctional monomer (XA) preferably has 9 or less radical polymerizable functional groups in the molecule because fragility of the cured product to be obtained can be suppressed. As the radical polymerizable functional group, an acryloyl group and a vinyl group may be typically mentioned.

The proportion of the radical polymerizable functional groups contained in the multifunctional monomer (XA) is a proportion such that the molecular weight of the multifunctional monomer (XA) per functional group is less than 110. At such a proportion, the crosslinking density is ensured to obtain a cured product having high scratch resistance. The molecular weight per functional group is preferably 85 or more because excessive increase in the hardness of the cured product to make the cured product brittle can be suppressed.

The radical polymerizable molecular weight per functional group is a value obtained by dividing molecular weight of the multifunctional monomer (XA) by the number of radical polymerizable functional groups. For example, when the multifunctional monomer (XA) is trimethylolpropane triacrylate, the molecular weight is 296, and the number of radical polymerizable functional groups is 3. Accordingly, the molecular weight per functional group is 98.7.

When the multifunctional monomer (XA) is used as a mixture of different monomers having the different numbers of functional groups, the molecular weight per functional group to be used is the average value obtained by dividing the total mass of the mixture by the number of moles of the radical polymerizable functional groups contained.

The multifunctional monomer (XA) has no terminal ethyl group in the molecule. If an ethyl group exists on the surface of the cured product, the ethyl group will reduce surface free energy and causes to be hydrophobized. For this reason, the surface of the cured product is easily hydrophilicized by providing no terminal ethyl group of the multifunctional monomer (XA). Acrylate is more preferable than methacrylate. For the same reason, the multifunctional monomer (XB) described later has no terminal ethyl group in the molecule and the bifunctional monomer (XC) has no terminal methyl group in the molecule.

As the multifunctional monomer (XA), for example, pentaerythritol triacrylate, pentaerythritol tetraacrylate, dipentaerythritol pentaacrylate and dipentaerythritol hexaacrylate can be used. These may be used singly or in combination of two or more.

The proportion of the multifunctional monomer (XA) contained in the polymerizable component (X) is 15 to 70% by mass, preferably 30 to 60% by mass, and more preferably 40 to 50% by mass in the polymerizable component (X). When the proportion of the multifunctional monomer (XA) is 15% by mass or more, a cured product having proper elastic modulus, hardness, and scratch resistance can be obtained. When the proportion of the multifunctional monomer (XA) is 70% by mass or less, fragility of the cured product to be obtained can be suppressed. When the uneven microstructure is formed with a stamper, occurrence of cracking when the stamper is removed can be suppressed.

[Multifunctional Monomer (XB)]

The multifunctional monomer (XB) has three or more radical polymerizable functional groups in the molecule, has the molecular weight per functional group of 110 or more, and has not terminal ethyl group in the molecule. The multifunctional monomer (XB) has a function to suppress increasing the hardness of the cured product due to the multifunctional monomer (XA) unit to make the cured product fragile, and has a function to adjust the balance of the whole polymerizable component (X) in the cured product as a unit for assisting the function of the bifunctional monomer (XC) unit described later to hydrophilicize the surface of the cured product.

The number of the radical polymerizable functional groups in the multifunctional monomer (XB) may be 3 or more, and is preferably 4 or more, more preferably 5 or more, and preferably 9 or less because the surface of the cured product has hydrophilicity and scratch resistance. Specific examples of the radical polymerizable functional group can be exemplified the same functional groups as those for the multifunctional monomer (XA).

The proportion of the radical polymerizable functional group in the multifunctional monomer (XB) is a proportion such that the molecular weight of the multifunctional monomer (XB) per functional group is 110 or more, preferably 150 or more, and preferably 500 or less, because the surface of the cured product has hydrophilicity and scratch resistance. A method for calculating the radical polymerizable molecular weight per functional group, and the molecular weight per functional group when the multifunctional monomer (XB) is used as a mixture of different monomers having the different numbers of functional groups are the same as described in the case of the multifunctional monomer (XA).

As such a multifunctional monomer (XB), for example, can include alkylene oxide-modified pentaerythritol triacrylate, alkylene oxide-modified isocyanuric acid triacrylate, alkylene oxide-modified glycerol triacrylate, alkylene oxide-modified pentaerythritol tetraacrylate, alkylene oxide-modified dipentaerythritol pentaacrylate, alkylene oxide-modified dipentaerythritol hexaacrylate and caprolactone-modified dipentaerythritol hexaacrylate may be mentioned. Here, alkylene oxide modification may exemplify ethylene oxide modification, propylene oxide modification, and butylene oxide modification. Specifically, for example, ethylene oxide-modified pentaerythritol tetraacrylate and ethylene oxide-modified dipentaerythritol pentaacrylate can be used. These may be used singly or in combination of two or more.

The proportion of the multifunctional monomer (XB) contained in the polymerizable component (X) is 15 to 50% by mass, and preferably 25 to 40% by mass in the polymerizable component (X). When a proportion of the multifunctional monomer (XB) contained is in the above range, the cured product to be obtained has proper elastic modulus, hardness, and scratch resistance and high decontaminant properties.

[Bifunctional Monomer (XC)]

The bifunctional monomer (XC) has two radical polymerizable functional groups and four or more oxyethylene (—$CH_2CH_2O$—) groups in the molecule, and has no terminal methyl group. The bifunctional monomer (C) has four or more oxyethylene groups. This can give hydrophilicity to the surface of the cured product, and facilitates wiping out dirt such as fingerprints.

The oxyethylene group preferably forms a continuous linear polyethylene glycol structure for giving hydrophilicity. The oxyethylene group forms the polyethylene glycol structure having a number of repeating of preferably 4 to 30, more preferably 6 to 25, and still more preferably 9 to 23. If the oxyethylene group has a number of repeating of 30 or less, crystallization of the bifunctional monomer (XC) can be suppressed, and handling is easy, and additionally, reduction of the crosslinking density of the cured product can be suppressed.

Specific examples of the radical polymerizable functional group in the bifunctional monomer (XC) can include the same as those in the multifunctional monomer (XA) and the multifunctional monomer (XB).

As the bifunctional monomer (XC), for example, polyethylene glycol diacrylate having a number of repeating oxyethylene groups of 4 to 30 may be mentioned. These may be used singly or in combination of two or more.

The proportion of the bifunctional monomer (XC) contained in the polymerizable component (X) is 15 to 40% by mass, preferably 20 to 30% by mass, and more preferably 25 to 30% by mass in the polymerizable component (X). When the proportion of the bifunctional monomer (XC) contained is 15% by mass or more, sufficient hydrophilicity can be given to the surface of the cured product to be obtained. When the proportion is 40% by mass or less, reduction in the crosslinking density can be suppressed to give a cured product having high scratch resistance.

[Monofunctional Monomer (XD)]

The monofunctional monomer (XD) is a compound having one radical polymerizable functional group in the molecule and copolymerizable with the monomers above. The monofunctional monomer (XD) is added, if necessary, in the range of no inhabitation of the functions of the monomers above. The active energy ray-curable resin composition is seldom cured itself to form a molding. Usually, as described later, the active energy ray-curable resin composition is applied onto a base material, and cured and molded integrally with the base material. The monofunctional monomer (XD) is used to enhance the penetrating property of the active energy ray-curable resin composition to the base material to improve the adhesion of the base material to the cured product, or to reduce viscosity. For this, an optimal monomer for giving adhesion is preferably used according to the material of the base material.

As the radical polymerizable functional group in the molecule of the monofunctional monomer (XD), for example, a methacryloyl group, an acryloyl group, an acrylamide group, and a vinyl group may be mentioned.

For improvement in the fingerprint wiping out properties of the cured product, a hydrophilic monomer is preferably used as the monofunctional monomer (XD). The hydrophilic monomer is a monomer such that 1 g or more of the monomer can be dissolved in 100 g of water at 25° C. The monofunctional monomer (XD) may have a terminal ethyl group. In case that the monofunctional monomer (XD) has a terminal ethyl group, the monofunctional monomer (XD) is used in the range of not impairing of hydrophilicity. As these hydrophilic monomers, specifically, monofunctional (meth)acrylates may be mentioned: for example, alkyl (meth)acrylates such as methyl (meth)acrylate, ethyl (meth)acrylate, n-butyl (meth)acrylate, i-butyl (meth)acrylate, t-butyl (meth)acrylate, 2-ethylhexyl (meth)acrylate and lauryl (meth)acrylate; benzyl (meth)acrylate; (meth)acrylates having an alicyclic structure such as isobornyl (meth)acrylate, tetrahydrofurfuryl (meth)acrylate, adamantyl (meth)acrylate, dicyclopentanyl (meth)acrylate, dicyclopentenyl (meth)acrylate; (meth)acrylates having an amino group such as dimethylaminoethyl (meth)acrylate and dimethylaminopropyl (meth)acrylate; (meth)acrylates having a hydroxyl group such as hydroxyethyl (meth)acrylate and hydroxypropyl (meth)acrylate; (meth)acrylamide derivatives such as (meth)acroylmorpholine and N,N-dimethyl (meth)acrylamide; and 2-vinylpyridine, 4-vinylpyridine, N-vinylpyrrolidone, N-vinylformamide, and vinyl acetate may be mentioned.

From the viewpoint of polymerization reactivity, as the monofunctional monomer (XD), preferably a less bulky monomer enabling suppression of steric hindrance and having low hydrophobicity as well as not inhibiting the decontaminant properties is used. Specifically, acryloylmorpholine, hydroxyethyl acrylate, N,N-dimethylacrylamide, N-vinylpyrrolidone, N-vinylformamide, methyl acrylate and ethyl acrylate may be mentioned. When the base material is an acrylic resin, methyl acrylate and ethyl acrylate are particularly preferable. These can be used singly or in combination of two or more. The proportion of the monofunctional monomer (XD) contained in the polymerizable component (X) is preferably 0 to 15% by mass, more preferably 0 to 10% by mass, and still more preferably 1 to 5% by mass in the polymerizable component (X). In case of the proportion of the monofunctional monomer (XD) of 15% by mass or less, curing of the active energy ray-curable resin composition is not inhibited. For this reason, reduction in the elastic modulus of the cured product, which occurs from the non-reacted monofunctional monomer (XD) remaining in the cured product and acting as a plasticizer, can be suppressed, and it is able to mold a cured product having high scratch resistance and a uneven microstructure on the surface.

[Other Polymerizable Components]

The polymerizable component (X) may include, as the other polymerizable components, multifunctional monomers, bifunctional monomers, monofunctional monomers, and oligomers/polymers having a radical polymerizable functional group in the range of not inhabitation of the functions of the above monomers. The proportion of these polymerizable components contained in the polymerizable component (X) is preferably 30% by mass or less, more preferably 20% by mass or less, and still more preferably 10% by mass or less.

[Photoinitiator (XE)]

The photoinitiator (XE) included in the active energy ray-curable resin composition of the second invention of the present application is a compound which generates radicals by irradiation with active energy ray, the radicals being capable of initiating a polymerization of the monomers included in the polymerizable component (X). Examples of the active energy ray can include visible light rays, ultraviolet light, electron beams, plasma, and thermal rays such as infrared radiation. Among them, the ultraviolet light is preferable from the viewpoint of cost of the apparatus and productivity.

As the photoinitiator (XE), those described in the first invention of the present application can be used. Specifically, benzophenone, 4,4-bis(diethylamino)benzophenone, 2,4,6-trimethylbenzophenone, methyl orthobenzoyl benzoate, 4-phenylbenzophenone, t-butyl anthraquinone, 2-ethyl anthraquinone, thioxanthones (such as 2,4-diethylthioxanthone, isopropylthioxanthone and 2,4-dichlorothioxanthone), acetophenones (such as diethoxyacetophenone, 2-hydroxy-2-methyl-1-phenylpropan-1-one, benzyl dimethyl ketal, 1-hydroxycyclohexyl-phenyl ketone, 2-methyl-2-morpholino(4-thiomethylphenyl)propan-1-one and 2-benzyl-2-dimethylamino-1-(4-morpholinophenyl)butan-1-one), benzoin ethers (such as benzoin methyl ether, benzoin ethyl ether, benzoin isopropyl ether and benzoin isobutyl ether), acylphosphine oxides (such as 2,4,6-trimethylbenzoyldiphenylphosphine oxide, bis(2,6-dimethoxybenzoyl)-2,4,4-trimethylpentylphosphine oxide and bis(2,4,6-trimethylbenzoyl)-phenylphosphine oxide), methylbenzoyl formate, 1,7-bisacridinylheptane, 9-phenylacridine and the like may be mentioned. These may be used singly or in combination of two or more. When these are combined two or more, they preferably have different absorption wavelengths each other in use.

As a thermal polymerization initiator, a persulfuric acid salt (such as potassium persulfate and ammonium persulfate), a peroxide (such as benzoyl peroxide), and an azo-based initiator can be used in combination.

The proportion of the photoinitiator (XE) contained is preferably 0.01 to 10 parts by mass, more preferably 0.1 to 5 parts by mass, and still more preferably 0.2 to 3 parts by mass based on 100 parts by mass of the polymerizable component (X). when the proportion of the photoinitiator (XE) contained is 0.01 parts by mass or more, the polymerization reaction of the polymerizable component (X) can be completed to form precisely an uneven microstructure on the surface of the cured product, and a cured product having high mechanical physical properties can be obtained. When the proportion of the photoinitiator (XE) is 10 parts by mass or less, reduction in the elastic modulus of the cured product, which occurs from the non-reacted photoinitiator (XE) remaining in the cured product and acting as a plasticizer, can be suppressed, a cured product having high scratch resistance can be obtained, and also coloring of the cured product can be suppressed.

[Other Components]

The resin composition of the second invention of the present application may further include an ultraviolet absorbing agent and/or an antioxidant (XF) and the like when necessary. The ultraviolet absorbing agent and/or antioxidant (XF) is used to absorb an excessive active energy ray not used for generation of radicals in the photoinitiator (XE) and to suppress degradation such as coloring of the resin.

As the ultraviolet absorbing agent, benzophenone-, benzotriazole-, hindered amine-, benzoate- and triazine-based ultraviolet absorbing agents and the like may be mentioned. As its commercially available products, "TINUVIN 400" and "TINUVIN 479" made by BASF SE, and "Viosorb110" made by KYODO CHEMICAL CO., LTD. (all are trade names) may be mentioned.

As the antioxidant, for example, hindered phenol-, benzimidazole-, phosphorus-, sulfur- and hindered amine-based antioxidants may be mentioned. As its commercially available products, "IRGANOX®" series made by BASF SE and the like may be mentioned.

These ultraviolet absorbing agents and antioxidants may be used singly or in combination of two or more.

The proportion of the ultraviolet absorbing agent and/or the antioxidant (XF) contained is preferably 0.01 to 5 parts by mass in total, based on 100 parts by mass of the polymerizable component (X).

In addition, when necessary, the active energy ray-curable resin composition may include additives such as a surfactant, a release agent, a lubricant, a plasticizer, an antistatic agent, a light stabilizer, a flame retardant, a flame retardant promoter, a polymerization inhibitor, a filler, a silane coupling agent, a colorant, a strengthening agent, an inorganic filler and an impact resistance modifier. Further, the active energy ray-curable resin composition may include oligomers and polymers having no radical polymerizable functional group, a slight amount of an organic solvent and the like.

[Viscosity of Resin Composition]

When the uneven microstructure is formed and cured with a stamper, similarly to the case of the first invention, it is preferable that the resin composition of the second invention of the present application also has proper viscosity because the resin composition easily flows into a uneven microstructure located on the surface of the stamper. The viscosity of the resin composition measured at 25° C. with a rotary B type viscometer is preferably 10000 mPa·s or less, more preferably 5000 mPa·s or less, and still more preferably 2000 mPa·s or less. Even though the viscosity of the resin composition is 10000 mPa·s or more, in case of using the resin composition having the viscosity in the above range by warming, workability is not impaired, so the resin composition needs not a resin composition having the viscosity at 25° C. in the above range. The resin composition has a viscosity measured at 70° C. with a rotary B type viscometer of preferably 5000 mPa·s or less, and more preferably 2000 mPa·s or less. When the viscosity is 10 mPa·s or more, the resin composition can contact the stamper, and can be used to mold a cured product having the uneven microstructure on the surface of the cured product.

The viscosity of the resin composition can be controlled by selecting the kind and content of the monomers to be contained or using a viscosity control agent. Specifically, the viscosity of the resin composition increases by using a large amount of a monomer having a functional group or chemical structure which has interactions between molecules such as hydrogen bond. The viscosity of the resin composition decreases by using a large amount of a low molecular weight monomer having no interaction between molecules.

Though the resin composition according to the invention of the present application has relatively low viscosity, the cured product to be obtained has proper hardness. As a result, such a resin composition can form a cured product having the uneven microstructure in which the uneven microstructure is released from the stamper well and is maintained, and having high scratch resistance and hydrophilicity giving high decontaminant properties such as fingerprint wiping out properties.

[Molded Article: Product Having the Uneven Microstructure]

The resin composition according to the present invention is polymerized and cured to form a molded article. For such a molded article, a product having the uneven microstructure particularly having an uneven microstructure on the surface thereof is extremely useful. Examples of the product having the uneven microstructure can include those having a base material and a cured resin layer having an uneven microstructure on the surface thereof.

A schematic sectional view of such a product having the uneven microstructure is shown in FIG. 1.

A product having the uneven microstructure A shown in FIG. 1(a) is layered a cured resin layer (surface layer) 2 formed by curing the active energy ray-curable resin composition of the present invention on the base material 1. The surface of the cured resin layer 2 has an uneven microstructure. The uneven microstructure has conical convex portions 3 (concave portions 4) formed at nearly equal intervals w1. The convex portion 3 preferably has a shape such that the cross sectional area in the vertical plane continuously increases from the top point side to the base material side because this shape can continuously increase the refractive index, suppress change of the reflectance following the wavelength (wavelength dependency), and suppress scattering of the visible light to be able to reduce the reflectance.

The interval w1 of the convex portions (concave portions) is adjusting not more than the wavelength of the visible light (specifically, 400 to 780 nm). When the interval w1 of the convex portions is 400 nm or less, scattering of the visible light can be suppressed, and the product having the uneven microstructure can be used suitably as antireflective coating for optical applications. The interval w1 is preferably 200 nm or less, and particularly preferably 150 nm or less. The interval w1 is preferably 20 nm or more because the convex portions are easily formed.

The height of the convex portion (depth of the concave portion), namely, a vertical distance d1 between a basic point 4a of the concave portion and a top 3a of the convex portion (hereinafter, referred to the "height of the convex portion" or "d1" unless otherwise specified) is preferably a depth that can suppress change of the reflectance following the wavelength. Specifically, the height of the convex portion is preferably 60 nm or more, more preferably 90 nm or more, furthermore preferably 150 nm or more and particularly preferably 180 nm or more. When d1 is in the vicinity of 150 nm, reflectance of the light at a wavelength band of 550 nm which is the most recognizable for human can be minimized. When d1 is 150 nm or more, the higher d1, the smaller the difference between the largest reflectance and the smallest reflectance in the range of visible light is. For this reason, in case of d1 being 150 nm or more, the reflected light has smaller wavelength dependency, and the difference of color in visual observation is not recognized.

Here, the interval w1 and height d1 of the convex portion each can be adopted an arithmetic average of measurements obtained by measuring an image at an accelerating voltage of 3.00 kV with a field emission scanning electron microscope (JSM-7400F: made by JEOL, Ltd.).

The convex portion 3 may have a bell-like shape as shown in FIG. 1(b). Additionally, any shape in which the cross sectional area in the vertical plane continuously increases from the top side to the base material side, e.g. a truncated cone shape can be employed.

Specifically, the cured resin layer is a film formed of a cured product of the resin composition, and has an uneven microstructure on the surface thereof. A preferable uneven microstructure is a structure in which approximately conical or pyramidal projections (convex portions) are regularly arranged. A preferable shape of the convex portion is a shape in which the vertical cross sectional area in the height direction continuously decreases from the surface of the base material to the top portion. Namely, the cross section in the height direction of the convex portion preferably has a shape, such as a triangular, trapezoidal or bell shape.

The uneven microstructure may not be limited to the embodiments shown in FIG. 1. The uneven microstructure may be formed on the surface of the product having the uneven microstructure. For example, the uneven microstructure is formed on one or both sides of the base material, or formed the full or partial surface (the area being necessity of transparency and/or super hydrophobicity) of the base material.

Such an uneven microstructure is preferably a moth eye structure in which the interval between convex portions is not more than the wavelength of the visible light. The moth eye structure formed on the surface of the cured product acts as an effective anti-reflective means by increasing the refractive index continuously against from air to the cured product. The average interval between convex portions w1 is preferably not more than the wavelength of the visible light, namely, 400 nm or less. When w1 is 400 nm or less, scattering of the visible light can be suppressed to give an anti-reflective effect. The average interval w1 is more preferably 200 nm or less, and particularly preferably 150 nm or less. The average interval w1 is preferably 20 nm or more because the convex portions are easily formed.

The average interval between convex portions w1 to be used is a value determined as follows: in an electron microscope image, an interval between adjacent convex portions (a distance from the center of one convex portion to the center of its adjacent convex portion) is measured at 50 points, and these measured values are arithmetically averaged.

At w1 of 100 nm, the height of the convex portion d1 is preferably 80 to 500 nm, more preferably 120 to 400 nm, and particularly preferably 150 to 300 nm. When d1 is 80 nm or more, the reflectance is sufficiently reduced, and the change of the reflectance in proportion of the wavelength, namely, the wavelength dependency of the reflectance is small. When $d_1$ is 500 nm or less, the convex portions have high scratch resistance.

The height of the convex portion $d_1$ is a value determined as follows: in an electron microscope image of 30000 times, a distance on a vertical plane between the highest point of one convex portion and the lowest point of the concave portion presenting between the adjacent convex portions is measured at 50 points, and these measured values are arithmetically averaged.

The aspect ratio of the convex portion (height of the convex portion $d_1$/average interval between convex portions $w_1$) is preferably 0.8 to 5, more preferably 1.2 to 4, and particularly preferably 1.5 to 3. When the aspect ratio of the convex portion is 1.0 or more, the reflectance is sufficiently reduced. When the aspect ratio is 5 or less, the convex portions have high scratch resistance.

The difference of the refractive index between the cured resin layer and the base material is preferably 0.2 or less, more preferably 0.1 or less, and particularly preferably 0.05 or less. When the difference of the refractive index is 0.2 or less, reflection at the interface between the cured resin layer and the base material can be suppressed.

The base material may be any base material which can support the cured resin layer having an uneven microstructure. When the product having the uneven microstructure is used as a display member, the base material is preferably a material which is transparent, that is, pervious to light. As a material forming a transparent base material, synthetic polymers such as a methyl methacrylate (co)polymer, a polycarbonate, a styrene (co)polymer and a methyl methacrylate-styrene copolymer; semi-synthetic polymers such as a cellulose diacetate, a cellulose triacetate and a cellulose acetate butyrate; polyesters such as a polyethylene terephthalate and a polylactic acid; polyamide; polyimide; polyether sulfone; polysulfone; polyethylene; polypropylene; polymethylpentene; polyvinylchloride; polyvinylacetal; polyetherketone; polyurethane; complexes of these polymers (such as a complex of polymethyl methacrylate and polylactic acid and a complex of polymethyl methacrylate and polyvinyl chloride); and glass may be mentioned.

The shape of the base material may be in any shape such as sheet and film. The base material can be produced by any production method such as injection, extrusion and casting. Further, in order to improve properties such as adhesion, antistatic, scratch resistance and weatherability, the surface of the transparent base material may be treated with coating or corona-treating.

Such a product having the uneven microstructure can be used as an anti-reflective film to give high scratch resistance and a high decontaminant effect such as fingerprint removal property.

[Method for Producing a Product Having the Uneven Microstructure]

The method for producing a product having the uneven microstructure may be, for example, (1) a method comprising disposing a resin composition between a stamper having the inverse structure of an uneven microstructure formed and a base material, curing the resin composition by irradiation with an active energy ray to transfer the uneven structure of the stamper; and subsequently, removing the stamper, and (2) a method comprising transferring the uneven structure of a stamper onto a resin composition, then removing the stamper, and subsequently, irradiating the resin composition with an active energy ray to be cured. Among them, the method (1) is particularly preferable for the transferability of the uneven microstructure and the freedom of the surface composition.

This method is particularly suitable in the case of using a belt- or roll-stamper enabling continuous production, and has high productivity.

[Stamper]

A surface of the stamper has the inverse structure of the uneven microstructure to be formed on the surface of the product having the uneven microstructure. As the material for the stamper, metals (inclosing those of which the surface are coated with oxide), quartz, glass, resins, ceramics and the like may be mentioned. The stamper may be shaped any of roll-like shape, cylindrical shape, plate-like shape, sheet shape and the like.

A method for forming the inverse structure of the uneven microstructure in the stamper is not particularly limited, and as specific examples thereof, the method include an electron beam lithography, laser light interference and the like may be mentioned. For example, a proper photoresist film is applied onto a suitable support substrate, and exposed to light such as an ultraviolet light laser, an electron beam, an X-ray to be developed. Thereby, a mold having the uneven microstructure formed therein is obtained. The mold can be used as a stamper as it is. The support substrate is dry etched with a photoresist layer being disposed thereon to perform selective etching. Then, the resist layer is removed. Thereby, the uneven microstructure is directly formed on the support substrate itself.

Anodized porous alumina can also be used for the stamper. For example, aluminum is subjected to anode oxidation at a predetermined voltage using oxalic acid, sulfuric acid, phosphoric acid, or the like as an electrolyte solution to form a porous structure having a pore diameter of 20 to 200 nm. This porous structure may be used for the stamper. According to this method, this highly pure aluminum is subjected to anode oxidation at a constant voltage for a long time. Then, the oxide coating is once removed, and aluminum is again subjected to anode oxidation. Thereby, pores highly regularly arranged can be formed in a self-organizing manner. Further, in the second anode oxidation step, the anodic oxidation treatment is combined with a pore diameter enlargement treatment. Thereby, an uneven microstructure whose cross section has a triangular or bell-like shape instead of a rectangular shape can also be formed. The times and conditions on the anodic oxidation treatment and the pore diameter enlargement treatment are properly controlled. Thereby, the angle of the innermost part of the pore can be sharpened.

Further, a replica may be formed from an original mold having an uneven microstructure by electroforming or the like, and used for the stamper.

The shape of the stamper is not particularly limited, and may be, for example, any of a flat plate shape, a belt-like shape, and a roll-like shape. Particularly, the stamper having a belt- or roll-like shape can continuously transfer the uneven microstructure and improve more productivity.

The resin composition is disposed between such a stamper and a base material. As a method for disposing a resin composition between a stamper and a base material, a method of filling the resin composition into a molding cavity by pressing the stamper and the base material in the state of disposing the resin composition between the stamper and the base material, and the like may be used.

As a method for polymerizing and curing the resin composition between the base material and the stamper by irradiation with an active energy ray, a method of polymerization-curing by irradiation with an ultraviolet light is preferable. For a lamp being to emit the ultraviolet light, for example, a high pressure mercury lamp, a metal halide lamp and a fusion lamp may be used.

The amount of the ultraviolet light to be irradiated may be determined according to the absorption wavelength and the content of the polymerization initiator. Usually, the integral amount of light preferably is 400 to 4000 mJ/cm$^2$, and more preferably 400 to 2000 mJ/cm$^2$. When the integral amount of light is 400 mJ/cm$^2$ or more, the resin composition is sufficiently cured and reduction of scratch resistance caused by insufficient curing can be suppressed. When the integral amount of light is 4000 mJ/cm$^2$ or less, coloring of the cured product and the degradation of the base material are significantly prevented. The intensity of irradiation is also, particularly not to be limited, preferably an output without promoting degradation of the base material and the like.

After polymerization and curing, the stamper is removed off to obtain a cured product having the uneven microstructure. Thus, a product having the uneven microstructure is obtained.

If the base material is a three-dimensional molded article, the formed product having the uneven microstructure may be bonded to the molded article which is molded separately.

The thus-obtained product having the uneven microstructure has the uneven microstructure of the stamper transferred onto the surface of the product having the uneven microstructure in a relationship between a key and a key hole, and has high scratch resistance. The product having the uneven microstructure has hydrophilicity to promote penetration of water between contaminants adhering to the surface thereof and the surface, and has a contaminant removing effect. Additionally, the product having the uneven microstructure can exhibit high anti-reflective performance because of continuous change in the refractive index, and is suitable for an anti-reflective film for films and three-dimensional molded articles.

Such a product having the uneven microstructure is suitable for a display member of image display devices used in computers, televisions, mobile phones and the like, such as liquid crystal display devices, plasma display panels, electroluminescence displays and cathode ray tube display devices. The product having the uneven microstructure can also be used by bonding the product having the uneven microstructure onto a surface of a target object such as lenses, display windows, and eye glasses, and is used in optical applications such as optical waveguides, relief holograms, lenses, and polarizing beam splitters, as well as applications of cell culturing sheets.

[Method for Producing Stamper]

The stamper which is formed of anodized porous alumina is useful for forming the uneven microstructure. Then, a method for producing a stamper useful in the present invention by forming a plurality of micro-pores having a predetermined shape on the surface of an aluminum substrate by anode oxidation will be explained using a process drawing shown in FIG. 2.

Step (a)

Step (a) is a step of performing anode oxidation on an aluminum substrate 10 in an electrolyte solution under a constant voltage to form an oxide coating on the surface of the aluminum substrate. For the aluminum substrate, aluminum having a purity of preferably 99% or more, more preferably 99.5% or more, and still more preferably 99.8% or more is used. When the aluminum purity is high, a relief pattern having a size that scatters the visible light is difficult to be formed by impurity segregation in the anode oxidation. Additionally, pores formed by anode oxidation are formed with regularity. The aluminum substrate may have an intended shape such as a roll-like, cylindrical, plate and sheet-like shape. The aluminum substrate preferably has a roll-like shape when the product having the uneven microstructure is obtained as a continuous film or sheet.

Since oil used in processing the aluminum substrate into a predetermined shape may adhere to the aluminum substrate, the aluminum substrate preferably is defatted in advance, and the surface of the aluminum substrate is subjected to electropolishing treatment (etching treatment) to make the surface smooth.

When such a surface-treated aluminum substrate is subjected to anode oxidation, an oxide coating 14 having pores 12 is formed.

As the electrolyte solution, sulfuric acid, oxalic acid, phosphoric acid, or the like is used. When oxalic acid is used as the electrolyte solution, oxalic acid at a concentration of 0.7 M or less can reduce the current value to form a dense oxide coating. In case of an anodization voltage of 30 to 60 V, the anodized porous alumina layer is formed as pores to be formed have a cycle regularity of ca. 100 nm. In case that the anodization voltage is either higher or lower than the above range, the regularity of the pores to be formed tends to drop. The temperature of the electrolyte solution is preferably 60° C. or less, and more preferably 45° C. or less. When the temperature of the electrolyte solution is 60° C. or less, occurrence of the so-call "burning" is suppressed, and breakage of the pores and formation of irregular pores caused by fusing of the surface of the anodized porous alumina layer are suppressed.

When the electrolyte solution is sulfuric acid, sulfuric acid having a concentration of 0.7 M or less can reduce the current value to form a dense oxide coating. In case of an anodization voltage of 25 to 30 V, an anodized porous alumina layer is formed as pores to be formed have a cyclic regularity of ca. 63 nm. If the anodization voltage is either higher or lower than the above range, the regularity of the pores to be formed tends to drop. The temperature of the electrolyte solution is preferably 30° C. or less, and more preferably 20° C. or less. When the temperature of the electrolyte solution is 30° C. or less, occurrence of the so-call "burning" is suppressed, and breakage of the pores and formation of irregular pores caused by fusing of the surface of the anodized porous alumina layer are suppressed.

Step (b)

In Step (b), the oxide coating is removed, and pore generation points for anode oxidation are formed on the surface of the aluminum substrate corresponding to portions of the pores 12 formed in the oxide coating in Step (a). Namely, when removing the oxide coating 14 formed in Step (a), concave portions 16 are formed on the aluminum substrate corresponding to the positions of the pores 12. By using these concave portions 16 as the pore generation point for anode oxidation, pores regularly arranged can be generated. In removal of the oxide coating, a solution that does not dissolve aluminum but selectively dissolves the oxide coating is used. Such a solution is, for example, a chromic acid/phosphoric acid mixed solution.

Step (c)

Step (c) is a step of performing anode oxidation again on the aluminum substrate and forming an oxide coating on the pore generation points to form pores. The aluminum substrate 10 being removed the oxide coating in Step (b) is again subjected to anode oxidation to form oxide coating 15 having cylindrical pores 13. The anode oxidation can be performed on the same condition as that in Step (a). As the time for the anode oxidation is longer, the deeper pores can be obtained.

Step (d)

Step (d) is a step of enlarging the diameter of the pores. The treatment of enlarging the diameter of the pores 13 (hereinafter, referred to as a "pore diameter enlarging") enlarges the diameters of the pores formed by the anode oxidation by dipping in a solution that dissolves the oxide coating. As such a solution, for example, ca. 5% by mass phosphoric acid aqueous solution may be used. As the time for the pore diameter enlargement treatment is longer, the diameter of the pore 13 becomes larger. Accordingly, the time of the treatment is set according to the intended shape.

Step (e)

Step (e) is a step of performing anode oxidation again on the aluminum substrate after the pore diameter enlarging. By performing anode oxidation again on the aluminum substrate, the depth of the pore 13 is deeper as the oxide coating 15 is thicker. The anode oxidation can be performed on the same condition as that of Step (a) (Step (c)). As the time for the anode oxidation is longer, the pores are deeper.

Step (f)

Step (f) is a step of repeatedly performing Step (d) and Step (e) to make the diameter of the pore 13 larger and deeper. This step forms the oxide coating 15 having the pores 13 having a shape in which the diameter of the pore continuously decreases from the opening to the depth direction. Thus, a stamper B having the convex portions formed of the anodized alumina formed on the surface of the aluminum substrate can be obtained. Preferably, the process ends at Step (d).

The repeating number in total is preferably 3 or more, and more preferably 5 or more. If the repeating number is 3 or more, the pores whose diameter continuously changes can be formed. Such a stamper can form a cured product whose surface has a moth eye structure that can reduce the reflectance.

The shape of the pore 13 has the inverse structure of the shape of the micro-relief to be formed on the surface of an article. Specifically, the shape is, for example, a near conical, pyramidal or cylindrical shape. A preferable shape is a shape such that the cross sectional area of the pore in the direction intersecting perpendicular to the depth direction continuously decreases from the topmost surface to the depth direction as conical and pyramidal shapes.

The average interval between the pores 13 is not more than the wavelength of the visible light, namely, preferably 400 nm or less, and preferably 20 nm or more. The average interval between the pores to be used is the average of values obtained by measuring the interval between adjacent pores in the electron microscope image (a distance from the center of one pore to the center of its adjacent pore) at 50 points.

When the average interval is 100 nm, the depth of the pore 13 is preferably 80 to 500 nm, more preferably 120 to 400 nm, and still more preferably 150 to 300 nm. The depth of the pore to be used is the average of values obtained by measuring a distance between the lowest point of the concave portion of the pore and the top in the electron microscope image of 30000 times at 50 points.

The aspect ratio of the pore 13 (depth/average interval) is preferably 0.8 to 5.0, more preferably 1.2 to 4.0, and still more preferably 1.5 to 3.0.

The surface having the uneven microstructure formed in the stamper can be treated with a release agent. As the release agent, a silicone resin, a fluorinated resin, a fluorine compound, and the like can be used. A fluorine compound having a hydrolyzable silyl group is particularly preferable. As commercially available products of the fluorine compound having a hydrolyzable silyl group, fluoroalkyl silane, KBM-7803 (made by Shin-Etsu Chemical Co., Ltd.), MRAF (made by ASAHIGLASS CO., LTD.), OPTOOL HD1100 and HD2100 series (made by HARVES Co., Ltd.), OPTOOL AES4 and AES6 (made by DAIKIN INDUSTRIES, LTD.), Novec EGC-1720 (made by Sumitomo 3M Limited), and FS-2050 series (made by Fluoro Technology K.K.) (all are trade names) may be mentioned.

Figure 3:
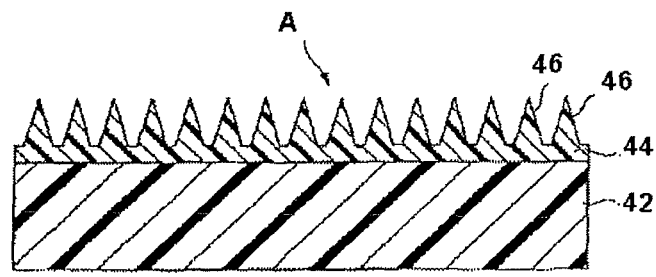
FIG. 3 is a schematic sectional view of a product having the uneven microstructure produced by the stamper according to FIG. 2.

A product having the uneven microstructure A formed using the stamper having the shape formed above has a cured resin layer 44 formed on the surface of the basic material 42 as shown in a schematic sectional view in FIG. 3. The cured resin layer 44 has the uneven microstructure having a plurality of convex portions 46 formed of the resin composition contacted with the stamper and cured.

[Raw Material for Imprint and Others]

As the material for imprint, not particularly to be limited, as long as the material includes the resin composition, the resin composition can be used as it is. A variety of additives can also be contained according to an intended molded article.

The raw material for imprint can also be used for molding the cured product by UV curing or thermal curing using a stamper. The following method can also be used: the stamper is pressed against the resin composition semi-cured by heating or the like, the resin composition is released from the stamper after the shape of the stamper is transferred onto the resin composition, and completely cured by heat or UV.

The resin composition can also be used as a raw material for forming a cured coating film on a variety of base materials. The resin composition can form a coating film as a coating material, and be irradiated with an active energy ray to form a cured product.

[Method for Continuously Producing Product Having the Uneven Microstructure]

Figure 4:
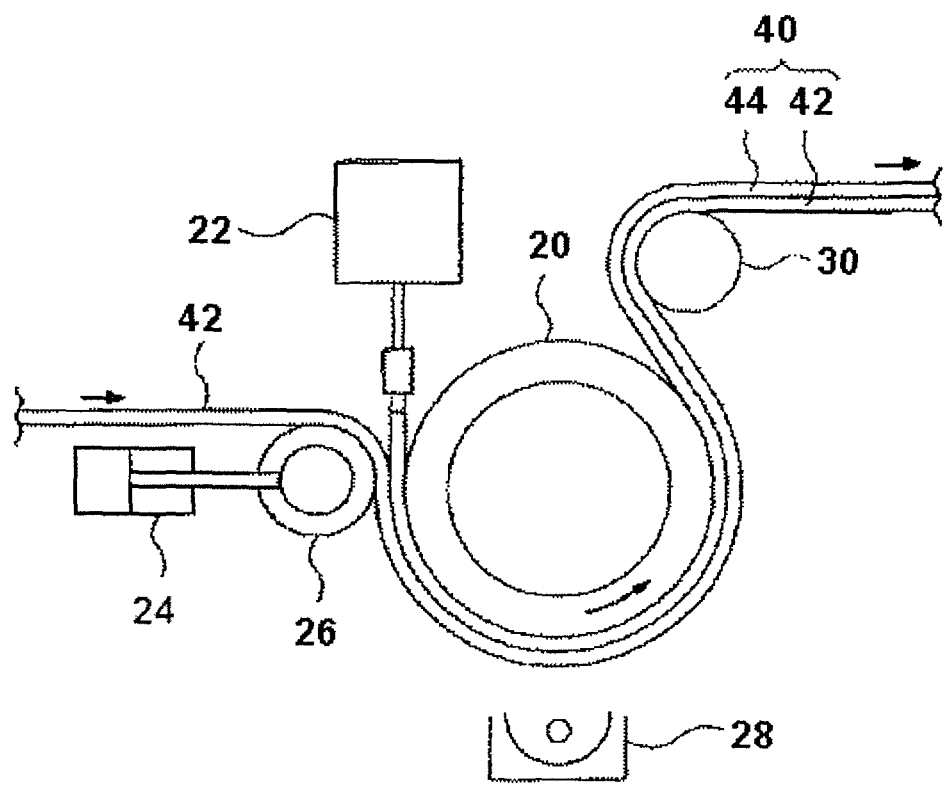
FIG. 4 is a block diagram showing an example of a production apparatus of the product having the uneven microstructure according to the invention of the present application.

The product having the uneven microstructure having the uneven microstructure on a surface thereof can be continuously produced using, for example, a production apparatus shown in FIG. 4.

The production apparatus shown in FIG. 4 includes a roll-like stamper 20 having the inverse structure (not shown) of the uneven microstructure on the surface thereof and a tank 22 for storing the resin composition. The resin composition is fed from the tank 22 between the roll-like stamper 20 and a base material 42. The base material 42 is a translucent belt-like film that moves along the surface of the stamper 20 as the stamper 20 rotates. The base material 42 and the resin composition are nipped between the roll-like stamper 20 and a nip roll 26 having a nip pressure controlled by a pneumatic cylinder 24. The resin composition is uniformly spread between the base material 42 and the roll-like stamper 20, and at the same time filled into void portions of the uneven microstructure in the roll-like stamper 20. An active energy ray irradiation apparatus 28 is located under the roll-like stamper 20. The resin composition is irradiated with an active energy ray through the base material 42, and cured. Thereby, a cured resin layer 44 having the uneven microstructure on the surface of the roll-like stamper 20 transferred thereto is formed. Subsequently, a product having the uneven microstructure 40 being integrated the cured resin layer 44 having the uneven microstructure formed on the surface and the base material 42 is released by a release roll 30.

The active energy ray irradiation apparatus 28 is preferably a high pressure mercury lamp, a metal halide lamp, or the like. In this case, the amount of light irradiation energy is preferably 100 to 10000 mJ/cm$^2$. As the material for the base material 42, an acrylic resin, a polycarbonate, a styrene-based resin, a polyester, a cellulose-based resin (such as triacetyl-cellulose), a polyolefin, an alicyclic polyolefin, and the like may be used.

The thus-obtained product having the uneven microstructure has high scratch resistance and decontaminant properties such as fingerprint wiping-off property of the uneven microstructure. Applications and developments of the product having the uneven microstructure in anti-reflective articles (such as anti-reflective films and anti-reflective coatings), optical goods such as optical waveguides, relief holograms, lenses, and polarizing beam splitters; and cell culture sheets can be expected. Moreover, the product having the uneven microstructure is particularly suitable for the application for anti-reflective articles.

As the anti-reflective articles, anti-reflective films, anti-reflective coatings, and anti-reflective sheets which are provided on the surfaces of, for example, image display devices (such as liquid crystal display devices, plasma display panels, electroluminescence displays and cathode ray tube display devices), lenses, display windows, and eye glasses. When an anti-reflective film is used in the image display devices, the anti-reflective film may be directly applied to the image display surface, or may be directly formed on the surface of a member that constitutes the image display surface, or may be formed on a front panel.

EXAMPLES

Hereinafter, the present invention will be specifically described by Examples. Hereinafter, unless otherwise specified, "parts" means "parts by mass." Methods of measurement and evaluation are shown as below.

(1) Measurement of Pores in Stamper

Pt was vapor deposited on a vertical cross section of a portion of the stamper formed of anodized porous alumina for 1 minute. The cross section was observed with a field emission scanning electron microscope (made by JEOL, Ltd., trade name JSM-7400F) at an accelerating voltage of 3.00 kV. The interval (cycle) of adjacent pores and the depth of the pore were measured. 10 intervals and 10 depths were measured, and the average of the 10 intervals and that of the 10 depths were calculated, respectively. The averages were defined as the measured values.

(2) Measurement of Concave Portions and Convex Portions of the Product Having the Uneven Microstructure Pt was vapor deposited on a vertical cross section of the product having the uneven microstructure for 10 minutes. The interval between adjacent convex portions or adjacent concave portions and height of the convex portion were measured on the same condition as that in (1) above with the same apparatus as that in (1) above. 10 intervals and 10 heights were measured, and the average value of the 10 intervals and that of the 10 heights were calculated. The average values were defined as the measurement values.

(3) Evaluation of Fingerprint Removal Property

A film having the product having the uneven microstructure on a surface thereof was bonded to a black acrylic plate. A disk-like rubber stamp having a diameter of 10 mm and a stamping surface to which 1 µl of an artificial fingerprint solution (prepared according to JIS K2246:2007) was applied was pressed at a pressure of 100 g/cm² for 3 seconds against the surface side of the product having the uneven microstructure (the surface having the uneven microstructure). Thereby, the artificial fingerprint solution adhered onto the surface of the uneven microstructure. The adhering artificial fingerprint solution was wiped off with a wet tissue paper (made by Nihon Ryutsu Sangyo Co., Ltd., non-alcohol type). The appearance of the film was visually observed, and evaluated by the below evaluation standard. The evaluation was performed by inclining a sample in many directions under an environment at a room temperature of 23° C. and a relative humidity of 65% under a fluorescent lamp (1000 lux). Evaluation of water droplets was conducted by dropping 1 µl of distilled water from a syringe onto the surface of the uneven microstructure of the sample placed horizontally and then observed.

A: No mark of the adhering fingerprints was found, and water droplets were not repelled.
B: No mark of the adhering fingerprints was found, but water droplets were repelled.
C: Marks of the adhering fingerprints were found.

(4) Evaluation of Fingerprint Wiping-Off Property

Using a wiper impregnated with 1.0 ml of tap water (made by DAIO PAPER CORPORATION, trade name Elleair Prowipe, 128×126 mm), the surface of the product having the uneven microstructure adhering the fingerprints was wiped in one direction. The appearance of the surface of the product having the uneven microstructure was visually observed after every wiping, and evaluated by the below evaluation standard. The fingerprints were applied to the surface of the uneven microstructure as in the evaluation (3) by applying the artificial fingerprint solution with a rubber stamp.

A: Fingerprints could be completely removed by wiping twice or less.
B: Fingerprints could be completely removed by wiping less than 10 times.
C: Fingerprints were remaining still after wiping 10 times.

(5) Evaluation of Appearance of Film after Water-Wiping

A film having the product having the uneven microstructure on the surface thereof was bonded to a black acrylic plate, and wiped with a wet tissue paper (made by Nihon Ryutsu Sangyo Co., Ltd., non-alcohol type). Then, the appearance of the film was visually observed, and evaluated on the below evaluation standard.

A: No wiped place was seen if the film was observed at any angle under a strong light.
B: Wiped places were not seen under a fluorescent lamp, but were seen if the film was observed at a low angle under a strong light.
C: Wiped places were seen clearly under a fluorescent lamp.

(6) Evaluation of Water Resistance

Using a wiper impregnated with 1.0 cc of tap water (made by DAIO PAPER CORPORATION, trade name Elleair Prowipe, 128×126 mm), the surface of an article adhering fingerprints was wiped in one direction. Then, the appearance of the surface of the article was observed, and evaluated by the below evaluation standard.

A: Good anti-reflective performance was maintained.
B: The film was slightly blurred white.
C: The film was clearly cloudy.

(7) Evaluation of Scratch Resistance-1

A wet tissue paper (made by Nihon Ryutsu Sangyo Co., Ltd., non-alcohol type) of a 1 cm square was mounted on an abrasion tester (made by Shinto Scientific Co., Ltd., trade name HEIDON TRIBOGEAR TYPE-30S), and the surface of the product having the uneven microstructure was scratched 1000 times at a load of 100 g, a round-trip distance of 50 mm, and a head speed of 60 mm/s thereby. Subsequently, the appearance was visually observed, and evaluated on the below evaluation standard.

S: No scuff could be found.
A: 1 to 2 lines of scuffs were found.
B: 3 to 5 lines of scuffs were found.
C: 6 or more lines of scuffs were found.

(8) Evaluation of Scratch Resistance-2

A canvas cloth of a 1 cm square was mounted on an abrasion tester (made by Shinto Scientific Co., Ltd., trade name HEIDON TRIBOGEAR TYPE-30S), and the surface of the product having the uneven microstructure was scratched 1000 times at a load of 100 g, a round-trip distance of 50 mm, and a head speed of 60 mm/s thereby. Subsequently, the appearance was visually observed, and evaluated on the below evaluation standard.

S: No scuff could be found.
A: 1 to 2 lines of scuffs were found.
B: 3 to 5 lines of scuffs were found.
C: 6 or more lines of scuffs were found.

(9) Evaluation of Scratch Resistance-3

Using an abrasion tester (made by Shinto Scientific Co., Ltd., trade name HEIDON TRIBOGEAR TYPE-30S), a steel wool of a 2 cm square (made by Nippon Steel Wool Co., Ltd., trade name Bonstar #0000) placed on the surface of the product having the uneven microstructure was reciprocally moved 10 times at a load of 100 g, a round-trip distance of 30 mm, and a head speed of 30 mm/sec. Subsequently, the product having the uneven microstructure was bonded to one surface of a transparent acrylic plate having a thickness of 2.0 mm (made by MITSUBISHI RAYON CO., LTD., trade name ACRYLITE). The product having the uneven microstructure was held to a fluorescent lamp indoors, the appearance thereof was visually observed, and evaluated on the below evaluation standard.

A: The confirmable scuffs were 4 lines or less.
B: The confirmable scuffs were from 5 to 19 lines.
C: The confirmable scuffs were 20 lines or more.

Production of Stamper

Production Example 1

Production of Stamper (Depth of 180 nm)

Figure 2:
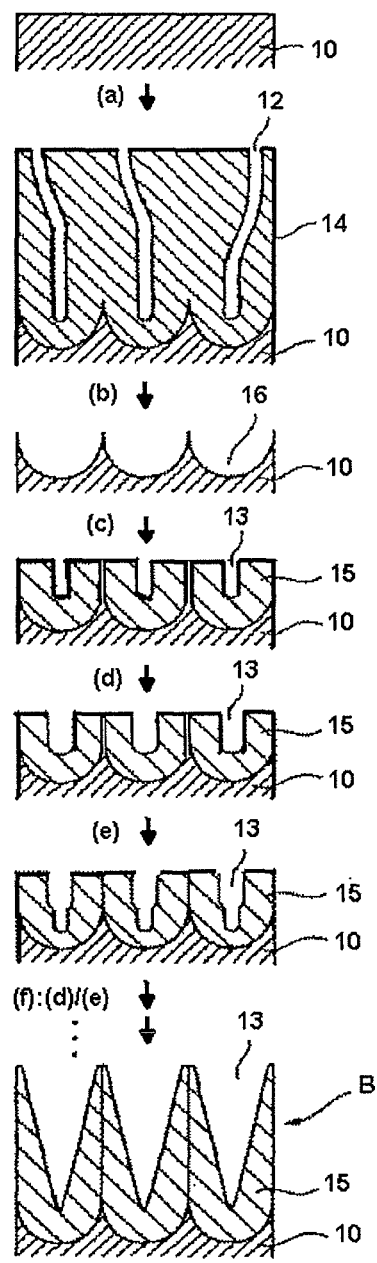
FIG. 2 is a drawing showing a production process of a stamper used for a method for producing a product having the uneven microstructure according to the invention of the present application.

With reference to the process drawing shown in FIG. 2, a method for producing a stamper will be described below.

An aluminum plate 30 having a purity of 99.99% was buffed and electropolished in perchloric acid/ethanol mixed solution (volume ratio of 1/4) to a mirror-finish.

Step (a)

The aluminum plate 30 was subjected to anode oxidation in a 0.3 M oxalic acid aqueous solution at a DC of 40 V and a temperature of 16° C. for 30 minutes to produce cracks 31 in an oxide coating 32.

Step (b)

The aluminum plate 30 was immersed in a 6% by mass phosphoric acid/1.8% by mass chromic acid mixed aqueous solution for 6 hours to remove the oxide coating 32.

Step (c)

The aluminum plate was subjected to anode oxidation in a 0.3 M oxalic acid aqueous solution at a DC of 40 V and temperature of 16° C. for 30 seconds to form an oxide coating 34. The oxide coating 34 had pores 31.

Step (d)

The aluminum plate having the oxide coating 34 formed thereon was immersed in a 5% by mass phosphoric acid at 32° C. for 8 minutes to perform the pore diameter enlarging of the pores 31.

Step (e)

Step (c) and Step (d) were repeated 5 times in total to obtain anodized porous alumina having approximately conical pores 31 having a cycle of 100 nm and a depth of 180 nm. The obtained anodized porous alumina was washed with deionized water, and the moisture on the surface thereof was removed by air blow. The anodized porous alumina was immersed for 10 minutes in a solution of a surface antifouling coating agent (made by DAIKIN INDUSTRIES, LTD., trade name OPTOOL DSX) diluted with a diluent (made by DAIKIN INDUSTRIES, LTD., trade name HD-ZV) such that the solid content was 0.1% by mass, and dried by air for 20 hours to obtain a stamper 20.

Production Example 2

Production of Stamper (Depth of 150 nm)

An anodized porous alumina having approximately conical pores having a cycle of 100 nm and a depth of 150 nm was obtained in the same manner as in Production Example 1 except that the phosphoric acid treatment time in Step (d) was changed from 8 minutes to 9 minutes.

Polymerization Reactive Monomer Component

Synthesis Example 1

Synthesis of Urethane Acrylate Compound (UA1)

In a glass flask, 117.6 g (0.7 mol) of hexamethylene diisocyanate, 151.2 g (0.3 mol) of an isocyanurate type hexamethylene diisocyanate trimer, 128.7 g (0.99 mol) of 2-hydroxy propyl acrylate, and 459 g (1.54 mol) of pentaerythritol triacrylate were placed. 100 ppm of di-n-butyltin dilaurate as a catalyst and 0.55 g of hydroquinone monomethyl ether as a polymerization inhibitor were charged therein. These were reacted on the condition of 70 to 80° C. until the concentration of the remaining isocyanate reached 0.1% or less. Thus, urethane acrylate compound (UA1) was obtained.

The multifunctional monomers (A) used in Examples 1 to 17 and Comparative Examples 1 to 5 and the value obtained by dividing the molecular weight of the multifunctional monomer (A) by the number of radical polymerizable functional groups (molecular weight per functional group) in each of the multifunctional monomers (A) are shown in Table 1.

TABLE 1

| Multifunctional monomer (A) abbreviation | Number of radical polymerizable functional groups (N) | Molecular weight (W) | W/N |
|---|---|---|---|
| UA1 | 4.6 | 696 | 155 |
| ATM-4E | 4 | 528 | 132 |
| A-TMPT-3EO | 3 | 428 | 143 |
| A-TMPT-9EO | 3 | 692 | 231 |

Note)
UA1: Urethane acrylate compound obtained in Synthesis Example 1.
ATM-4E: Ethoxylated pentaerythritol tetraacrylate (made by Shin Nakamura Chemical Co., Ltd., trade name NK Ester ATM-4E).
A-TMPT-3EO: Ethoxylated trimethylolpropane triacrylate (made by Shin Nakamura Chemical Co., Ltd., trade name NK Ester TMPT-3EO).
A-TMPT-9EO: Ethoxylated trimethylolpropane trimethacrylate (made by Shin Nakamura Chemical Co., Ltd., trade name NK Ester TMPT-9EO.)

Other components used in Examples and Comparative Examples are shown.

AM90G: Terminal methoxylated polyethylene glycol monoacrylate (EO=ca. 9 mol) (made by Shin Nakamura Chemical Co., Ltd., trade name NK Ester AM-90G).

AM130G: Terminal methoxylated polyethylene glycol monoacrylate (EO=ca. 13 mol) (made by Shin Nakamura Chemical Co., Ltd., trade name NK Ester AM-130G).

AM230G: Terminal methoxylated polyethylene glycol monoacrylate (EO=ca. 23 mol) (made by Shin Nakamura Chemical Co., Ltd., trade name NK Ester AM-230G).

AE400: Polyethylene glycol (EO=ca. 9 mol) monoacrylate (made by NOF CORPORATION, trade name Blemmer AE-400).

A-600: Polyethylene glycol diacrylate (EO=ca. 12 mol) (made by Shin Nakamura Chemical Co., Ltd., trade name NK Ester A-600).
AM60G: Terminal methoxylated polyethylene glycol monoacrylate (EO=ca. 6 mol) (made by Shin Nakamura Chemical Co., Ltd., trade name NK Ester AM-60G).
MA: Methyl acrylate (made by Mitsubishi Chemical Corporation).
DPHA: Dipentaerythritol (penta/hexa)acrylate (made by Shin Nakamura Chemical Co., Ltd., trade name: NK Ester A-DPH).
AM121: Inner release agent (made by ICMG Co., Ltd, trade name Mold Wiz AM-121)
DAR TPO: 2,4,6-trimethylbenzoyl-diphenyl-phosphine oxide (made by BASF SE, trade name DAROCURE TPO).
WE97A: Polyethylene terephthalate film (made by Mitsubishi Plastics, Inc., trade name Mitsubishi DIAFOIL WE97A, thickness of 38 μM).
A-4300: Polyethylene terephthalate film (made by TOYOBO CO., LTD., trade name COSMOSHINE A-4300, thickness of 188 μm).

Example 1

Preparation of Resin Composition

An active energy ray-curable resin composition was prepared by mixing 70 parts of UA1 obtained in Synthesis Example 1 as the multifunctional monomer (A), 30 parts of AM90G as the mono(meth)acrylate (B) having the polyethylene glycol structure having a number of repeating ethylene glycol units of 9 or more, 0.5 parts of DAR TPO as the active energy ray polymerization initiator and 0.1 parts of AM121 as the inner release agent.
[Production of the Product Having the Uneven Microstructure]
The active energy ray-curable resin composition was poured on the surface of the stamper having pores formed thereon, and coated with pressing and spreading by a polyethylene terephthalate film (WE97A) having a thickness of 38 μm. Subsequently, the resin composition was irradiated with the ultraviolet light from the film side using a fusion lamp at a belt speed of 6.0 m/min such that the accumulated light amount was 1000 mJ/cm$^2$, and cured. Next, the film was released from the stamper to obtain a product having the uneven microstructure.
The uneven microstructure of the stamper was transferred onto the surface of the product having the uneven microstructure. As shown in FIG. 1(a), a near conical uneven microstructure having the interval between adjacent convex portions 13 (distance w1) of 100 nm and the height d1 of the convex portion 13 of 180 nm or 150 nm was formed. The product having the uneven microstructure was evaluated for the fingerprint removal property, change in the appearance after water-wiping and scratch resistance. The results are shown in Table 2.

Examples 2 to 12, Comparative Examples 1 to 5

Products having the uneven microstructure were produced in the same manner as in Example 1 except that the monomer compositions were changed as shown in Tables 2 to 4, and evaluated in the same manner as in Example 1. The obtained results are shown in Tables 2 to 4. In Tables 2 to 4, the blending amounts are expressed by "parts."

TABLE 2

| | | Example | | | | | |
|---|---|---|---|---|---|---|---|
| | | 1 | 2 | 3 | 4 | 5 | 6 |
| Multifunctional monomer (A) | UA1 | 70 | 80 | 70 | 80 | 85 | 80 |
| | A-TMPT-3EO | — | — | — | — | — | — |
| | ATM-4E | — | — | — | — | — | — |
| Monomer (B) | AM90G | 30 | 20 | — | — | — | — |
| | AM130G | — | — | 30 | 20 | 15 | — |
| | AM230G | — | — | — | — | — | 20 |
| | AE400 | — | — | — | — | — | — |
| Monomer (C) | A-600 | — | — | — | — | — | — |
| | AM60G | — | — | — | — | — | — |
| | MA | — | — | — | — | — | — |
| | A-TMPT-9EO | — | — | — | — | — | — |
| Release agent | AM121 | 0.1 | 0.1 | 0.1 | 0.1 | 0.1 | 0.1 |
| Initiator | DAR TPO | 0.5 | 0.5 | 0.5 | 0.5 | 0.5 | 0.5 |
| Fingerprint removal property | | A | A | A | A | A | A |
| Appearance after water-wiping | d1 = 150 nm | A | A | A | A | A | A |
| | d1 = 180 nm | B | A | B | A | A | A |
| Scratch resistance-1 | d1 = 180 nm | B | S | B | S | S | A |

TABLE 3

| | | Example | | | | | |
|---|---|---|---|---|---|---|---|
| | | 7 | 8 | 9 | 10 | 11 | 12 |
| Multifunctional monomer (A) | UA1 | 70 | — | — | — | 80 | 80 |
| | A-TMPT-3EO | — | 90 | — | — | — | — |
| | ATM-4E | — | — | 80 | 90 | — | — |
| Monomer (B) | AM90G | — | — | — | — | — | — |
| | AM130G | — | 10 | 20 | 10 | 14 | 15 |
| | AM230G | — | — | — | — | — | — |
| | AE400 | 30 | — | — | — | — | — |
| Monomer (C) | A-600 | — | — | — | — | — | — |
| | AM60G | — | — | — | — | — | — |
| | MA | — | — | — | — | 6 | 5 |
| | A-TMPT-9EO | — | — | — | — | — | — |
| Release agent | AM121 | 0.1 | 0.1 | 0.1 | 0.1 | 0.1 | 0.1 |
| Initiator | DAR TPO | 0.5 | 0.5 | 0.5 | 0.5 | 0.5 | 0.5 |
| Fingerprint removal property | | A | A | A | A | A | A |
| Appearance after water-wiping | d1 = 150 nm | A | A | A | A | A | A |
| | d1 = 180 nm | B | A | A | A | A | A |
| Scratch resistance-1 | d1 = 180 nm | B | S | A | S | A | B |

TABLE 4

| | | Comparative Example | | | | | | |
|---|---|---|---|---|---|---|---|---|
| | | 1 | 2 | 3 | 4 | 5 | 6 | 7 |
| Multifunctional monomer (A) | UA1 | 70 | 60 | 70 | — | — | 80 | — |
| | A-TMPT-3EO | — | — | — | — | — | — | — |
| | ATM-4E | — | — | — | 96 | — | — | — |
| Monomer (B) | AM90G | — | — | — | — | — | — | — |
| | AM130G | — | — | — | 4 | 15 | — | 20 |
| | AM230G | — | — | — | — | — | — | — |
| | AE400 | — | — | — | — | — | — | — |
| Monomer (C) | A-600 | 30 | 40 | — | — | — | 20 | — |
| | AM60G | — | — | 30 | — | — | — | — |
| | MA | — | — | — | — | — | — | — |
| | A-TMPT-9EO | — | — | — | — | 85 | 85 | — |
| | DPHA | — | — | — | — | — | — | 80 |
| Release agent | AM121 | 0.1 | 0.1 | 0.1 | — | 0.1 | 0.1 | 0.1 |
| Initiator | DAR TPO | 0.5 | 0.5 | 0.5 | — | 0.5 | 0.5 | 0.5 |
| Fingerprint removal property | | B | A | C | C | A | C | — |

TABLE 4-continued

|   |   | Comparative Example | | | | | | |
|---|---|---|---|---|---|---|---|---|
|   |   | 1 | 2 | 3 | 4 | 5 | 6 | 7 |
| Appearance after water-wiping | d1 = 150 nm | A | B | A | A | B | A | — |
|   | d1 = 180 nm | A | C | A | A | C | A | — |
| Scratch resistance-1 | d1 = 180 nm | B | C | A | A | C | A | — |

Examples 13 to 17

Products having the uneven microstructure were produced in the same manner as in Example 1 except that the monomer compositions were changed as shown in Table 5, and evaluated in the same manner as in Example 1. The scratch resistance indicates scratch resistance 2. The obtained results are shown in Table 5. In Table 5, the blending amounts are expressed by "parts."

TABLE 5

|   |   | Example | | | | |
|---|---|---|---|---|---|---|
|   |   | 13 | 14 | 15 | 16 | 17 |
| Multifunctional monomer (A) | UA1 | 80 | 80 | 85 | 85 | 80 |
|   | ATM-4E | — | — | — | — | — |
| Monomer (B) | AM130G | 20 | 20 | 15 | 15 | 14 |
| Monomer (C) | MA | — | — | — | — | 6 |
| Slip agent (D) | SH3746 | 1 | — | 3 | — | 3 |
|   | KF355A | — | 1 | — | 3 | — |
| Release agent | AM121 | 0.1 | 0.1 | 0.1 | 0.1 | 0.1 |
| Initiator | DAR TPO | 0.5 | 0.5 | 0.5 | 0.5 | 0.5 |
| Fingerprint removal property | | A | A | A | A | A |
| Appearance after | d1 = 150 nm | A | A | A | A | A |
| Wate-wiping | d1 = 180 nm | A | A | A | A | A |
| Scratch resistance-2 | d1 = 180 nm | A | A | S | S | A |

As is clear from the results, the products having the uneven microstructure obtained by curing the resin compositions in Examples had a high fingerprint removal property, water resistance so as not to impair the appearance by water-wiping, and scratch resistance (repeating of water-wiping).

In Comparative Examples 1, 3, and 6, a proper hydrophilic monomer was not used. For this reason, 30 parts of the hydrophilic monomer was added but the fingerprint dirt could not be removed. As shown in Comparative Example 2, when 40 parts of hydrophilic monomer was added, the appearance of the film was impaired by water-wiping. In Comparative Example 4, the amount of the hydrophilic monomer to be added was small, and fingerprint removal property was impaired. In Comparative Examples 5 and 7, no proper multifunctional monomer was used. For this reason, the resin had a low hardness in Comparative Example 5, and the appearance of the film was impaired by water-wiping. In Comparative Example 7, the resin had a high hardness but was fragile. The resin was cracked when released from the stamper, and could not be recovered and evaluated.

Abbreviations, number of functional groups, and molecular weight per functional group of the compounds used in Examples 18 to 25 and Comparative Examples 8 to 13 are shown in Table 6. The symbol "prime" given in the kind of monomers indicates that the monomers are similar to monomers which belong to those kinds.

TABLE 6

| Kind of monomers | Abbreviation | Number of functional groups | Molecular weight per functional group | Ethyl group | Methyl group | Number of moles of EO |
|---|---|---|---|---|---|---|
| (XA) | DPHA | 5-6 | 96 | No | — | — |
| (XA) | PETA | 3-4 | 99 | No | — | — |
| (XA)' | DTMPTA | 4 | 117 | Yes | — | — |
| (XA)' | TMPTA | 3 | 99 | Yes | — | — |
| (XB) | PETA-4E | 4 | 132 | No | — | 4 |
| (XB) | DPHA-12E | 6 | 185 | No | — | 12 |
| (XC) | PEGDA-4E | 2 | 154 | — | No | 4 |
| (XC) | PEGDA-14E | 2 | 374 | — | No | 14 |
| (XC) | PEGDA-23E | 2 | 554 | — | No | 23 |
| (XC)' | BisADA-17E | 2 | 608 | — | Yes | 17 |
| (XD) | MA | 1 | 86 | No | Yes | — |
| (XD) | HEA | 1 | 116 | No | No | — |

Note)
DPHA: Dipentaerythritol (penta/hexa)acrylate (made by Shin Nakamura Chemical Co., Ltd., trade name: NK Ester A-DPH).
PETA: Pentaerythritol (tri/tetra)acrylate (made by Shin Nakamura Chemical Co., Ltd., trade name; NK Ester A-TMM-3).
DTMPTA: Ditrimethylolpropane tetraacrylate (Shin Nakamura Chemical Co., Ltd., trade name: NK Ester AD-TMP).
TMPTA: Trimethylolpropane triacrylate (Shin Nakamura Chemical Co., Ltd., trade name: NK Ester A-TMPT).
PETA-4E: Ethylene oxide-modified pentaerythritol tetraacrylate (EO = 4 mol) (made by Shin Nakamura Chemical Co., Ltd., trade name NK Ester ATM-4E).
DPHA-12E: Ethylene oxide-modified dipentaerythritol hexaacrylate (EO = 12 mol) (made by NIPPON KAYAKU Co., Ltd., trade name: KAYARAD-12).
PEGDA-4E: Polyethylene glycol diacrylate (EO = 4 mol) (made by Shin Nakamura Chemical Co., Ltd., trade name: NK Ester A-200).
PEGDA-14E: Polyethylene glycol diacrylate (EO = 14 mol) (made by Shin Nakamura Chemical Co., Ltd., trade name: NK Ester A-600).
PEGDA-23E: Polyethylene glycol diacrylate (EO = 23 mol) (made by Shin Nakamura Chemical Co., Ltd., trade name: NK Ester A-1000).
BisADA-17E: Ethylene oxide-modified bisphenol A diacrylate (EO = 17 mol) (made by Shin Nakamura Chemical Co., Ltd., trade name: NK Ester A-BPE-20).
MA: Methyl acrylate (made by Mitsubishi Chemical Corporation).
HEA: Hydroxyethyl acrylate (made by OSAKA ORGANIC CHEMICAL INDUSTRY LTD.).

Example 18

An active energy ray-curable resin composition was prepared by weighing 25 parts by mass of DPHA, 25 parts by mass of PETA, 25 parts by mass of DPHA-12E and 25 parts by mass of PEGDA-14E as the monomers, and mixing 1.0 part by mass of IRGACURE 184 (made by BASF SE, trade name) and 0.5 parts by mass of IRGACURE 819 (made by BASF SE, trade name) as the polymerization initiator. Several drops of the obtained active energy ray-curable resin composition were putted onto the surface of the stamper produced in Production Example 1 and coated with pressing and spreading by a polyethylene terephthalate film (A-4300) having a thickness of 188 μm. The active energy ray-curable resin composition was irradiated from the film side using a high pressure mercury lamp with the ultraviolet light at energy of 2000 mJ/cm$^2$, and cured. The stamper was removed from the film to obtain a product having the uneven microstructure having an uneven microstructure on the surface thereof in which the uneven microstructure had the average interval: 100 nm and height: 180 nm of the convex portions. The obtained product having the uneven microstructure was measured and evaluated for (9) scratch resistance-3, (4) fingerprint wiping-off property, and (6) water resistance. The results are shown in Table 7.

Examples 19 to 25, Comparative Examples 8 to 13

Products having the uneven microstructure were obtained in the same manner as in Example 18 except that the composition of the active energy ray-curable resin compositions was changed to the composition as shown in Table 7 or Table 8. The obtained product having the uneven microstructure was evaluated in the same manner as in Example 18. The results are shown in Tables 7 and 8.

TABLE 7

| Monomer component | | Example | | | | | | | |
|---|---|---|---|---|---|---|---|---|---|
| Kind | Abbreviation | 18 | 19 | 20 | 21 | 22 | 23 | 24 | 25 |
| Composition Parts by mass (XA) | DPHA | 25 | 20 | 25 | 20 | 30 | 20 | 35 | 30 |
| (XA) | PETA | 25 | 25 | 20 | 20 | 40 | — | — | — |
| (XA)' | DTMPTA | — | — | — | — | — | — | — | — |
| (XA)' | TMPTA | — | — | — | — | — | — | — | — |
| (XB) | PETA-4E | — | — | — | — | — | 40 | — | — |
| (XB) | DPHA-12E | 25 | 25 | 15 | 40 | 15 | — | 20 | 50 |
| (XC) | PEGDA-4E | — | — | 40 | — | — | 40 | — | — |
| (XC) | PEGDA-14E | 25 | 25 | — | 15 | — | — | 30 | 20 |
| (XC) | PEGDA-23E | — | — | — | — | 15 | — | — | — |
| (XC)' | BisADA-17E | — | — | — | — | — | — | — | — |
| (XD) | MA | — | 5 | — | — | — | — | 5 | — |
| (XD) | HEA | — | — | — | 5 | — | — | 10 | — |
| Evaluation | Scratch resistance-3 | A | A | B | A | A | A | A | A |
| | Fingerprint wiping-off property | A | A | A | A | B | A | A | A |
| | Water resistance | A | A | A | A | A | B | A | A |

TABLE 8

| Monomer component | | Comparative Example | | | | | |
|---|---|---|---|---|---|---|---|
| Kind | Abbreviation | 8 | 9 | 10 | 11 | 12 | 13 |
| Composition Parts by mass (XA) | DPHA | — | — | 25 | 25 | 40 | 10 |
| (XA) | PETA | — | — | 25 | 30 | 40 | — |
| (XA)' | DTMPTA | — | 25 | — | — | — | — |
| (XA)' | TMPTA | 50 | 25 | — | — | — | — |
| (XB) | PETA-4E | — | — | — | — | — | — |
| (XB) | DPHA-12E | 25 | 25 | 25 | — | 10 | 45 |
| (XC) | PEGDA-4E | — | — | — | — | — | — |
| (XC) | PEGDA-14E | 25 | 25 | — | 45 | 10 | 45 |
| (XC) | PEGDA-23E | — | — | — | — | — | — |
| (XC)' | BisADA-17E | — | — | 25 | — | — | — |
| (XD) | MA | — | — | — | — | — | — |
| (XD) | HEA | — | — | — | — | — | — |
| Evaluation | Scratch resistance 3 | A | A | B | C | C | C |
| | Fingerprint wiping-off property | C | C | C | A | C | A |
| | Water resistance | A | A | A | C | A | C |

As is clear from the results, the articles obtained in Examples 18 to 25 had high scratch resistance, fingerprint wiping-off property, and water resistance. Meanwhile, the articles obtained in Comparative Example 8 and Comparative Example 9 in which no multifunctional monomer (XA) was used, and the article obtained in Comparative Example 10 in which no bifunctional monomer (XC) was used were impaired in fingerprint wiping-off property. In the article obtained in Comparative Example 11 in which no multifunctional monomer (XB) and a large amount of the bifunctional monomer (C) were used, scratch resistance and water resistance were impaired. In the article obtained in Comparative Example 12 in which a large amount of the multifunctional monomer (XA) and small amounts of the multifunctional monomer (XB) and the bifunctional monomer (XC) were used, and conversely, the article obtained in Comparative Example 13 in which a small amount of the multifunctional monomer (XA) and large amounts of the multifunctional monomer (XB) and the bifunctional monomer (XC) were used, scratch resistance and water resistance were impaired.

INDUSTRIAL APPLICABILITY

The product having the uneven microstructure obtained by curing the active energy ray-curable resin composition of the invention of the present application maintains high optical performance as a product having the uneven microstructure, and has a high fingerprint removal performance. Accordingly, the product having the uneven microstructure is usable in applications of display members for mobile phones, televisions, and personal computers and construction materials such as windows and showcases, and is extremely useful for industry.

REFERENCE SIGNS LIST 1, 42 Base material
2, 44 Cured resin layer (Surface layer)
3, 46 Convex portion(s)
3a Top of convex portion
4 Concave portion(s)
4a Basic point of concave portion
10 Aluminum substrate
12 Pore(s)
13 Cylindrical pore(s)
14 Oxide coating
15 Oxide coating having cylindrical pores 13
16 Concave portion of aluminum substrate (Pore generating point for anode oxidation)
20 Roll-like stamper
22 Tank (Storing an active energy ray-curable resin composition)
24 Pneumatic cylinder
26 Nip roll
28 Active energy ray irradiation apparatus
30 Releasing roller
40 Continuous produced product having the uneven microstructure
A Product having the uneven microstructure
B Stamper
d1 Vertical distance between basic point 4a and top 3a (Height of convex portion)
w1 Interval between convex portions (concave portions)

The invention claimed is:

1. An active energy ray-curable resin composition comprising:
   a polymerizable component (X); and
   a photoinitiator (XE),
   wherein the polymerizable component (X) comprises:
   15 to 70% by mass of a multifunctional monomer (XA) which has three or more radical polymerizable functional groups in the molecule, a molecular weight per functional group of less than 110, and no terminal ethyl group;
   15 to 50% by mass of a multifunctional monomer (XB) which has three or more radical polymerizable functional groups in the molecule, a molecular weight per functional group of 110 or more, and no terminal ethyl group; and
   15 to 40% by mass of a bifunctional monomer (XC) which has two radical polymerizable functional groups and four or more oxyethylene groups in the molecule, and no terminal methyl group.

2. The active energy ray-curable resin composition according to claim 1, wherein the polymerizable component (X) further comprises 15% by mass or less of a monomer (XD) having one radical polymerizable functional group in the molecule.

3. A material for imprint, comprising an active energy ray-curable resin composition according to claim 1.

4. The material for imprint according to claim 3, wherein the material is used for forming an uneven microstructure.

5. A molded article consisting of a cured product of an active energy ray-curable resin composition according to claim 1 or comprising a cured resin layer of an active energy ray-curable resin composition according to claim 1.

6. The molded article according to claim 5, wherein the molded article has an uneven microstructure on the surface.

7. The molded article according to claim 5, wherein the molded article is a display member.

8. A method for producing a product having the uneven microstructure having a cured resin layer having an uneven microstructure on the surface, wherein the method comprises at least following steps:
1) disposing an active energy ray-curable resin composition according to claim 1 between a stamper having an inverse structure of the uneven microstructure and a base material;
2) irradiating the active energy ray-curable resin composition with an active energy ray to cure the active energy ray-curable resin composition, and
3) removing the stamper.

9. A product having the uneven microstructure having an uneven microstructure on the surface,
wherein the product having the uneven microstructure is formed by contacting an active energy ray-curable resin composition according to claim 1 with a stamper having an inverse structure of the uneven microstructure on the surface, and curing the active energy ray-curable resin composition.

10. The product having the uneven microstructure according to claim 9, wherein the product having the uneven microstructure is an anti-reflective article.

\* \* \* \* \*